(12) United States Patent
DuPertuis et al.

(10) Patent No.: US 8,089,975 B2
(45) Date of Patent: Jan. 3, 2012

(54) HIGHLY SCALABLE INTERNET PROTOCOL-BASED COMMUNICATIONS SYSTEM

(75) Inventors: Greg DuPertuis, Leesburg, VA (US); Mark Fedor, Purcellville, VA (US)

(73) Assignee: Sunrocket (Assignment for the Benefit of Creditors), LLC, Mountain View, CA (US)

( * ) Notice: Subject to any disclaimer, the term of this patent is extended or adjusted under 35 U.S.C. 154(b) by 920 days.

(21) Appl. No.: 12/109,908

(22) Filed: Apr. 25, 2008
(Under 37 CFR 1.47)

(65) Prior Publication Data
US 2009/0201911 A1 Aug. 13, 2009

Related U.S. Application Data

(63) Continuation of application No. 11/857,290, filed on Sep. 18, 2007, now abandoned.

(51) Int. Cl.
*H04L 12/28* (2006.01)
*H04J 1/16* (2006.01)

(52) U.S. Cl. ......... 370/401; 370/252; 370/352; 370/389

(58) Field of Classification Search .................. 370/352, 370/401, 389, 252
See application file for complete search history.

(56) References Cited

U.S. PATENT DOCUMENTS
2006/0045068 A1* 3/2006 Wu et al. ................. 370/352
* cited by examiner

*Primary Examiner* — John Pezzlo
(74) *Attorney, Agent, or Firm* — Greenberg Traurig LLP

(57) ABSTRACT

A highly scalable Internet Protocol (IP) based communications system which provides voice and other communication services to end-users. The instant system incorporates a unique architecture which simplifies scaling of services to hundreds of thousands and even millions of subscribers. The instant system architecture includes a means for directly connecting a plurality of peered service providers thereby obviating the need to move the communications across the PSTN. By bypassing the PSTN, the instant system can leverage the advantages of IP-based networks in meeting subscriber communications needs such as, without limitation, quality of service, service up-time, and advanced feature sets. Bypassing the PSTN also allows the peered partners to negotiate communications rates between themselves, without incurring PSTN carrier fees.

21 Claims, 10 Drawing Sheets

HIGHLY SCALABLE INTERNET PROTOCOL-BASED COMMUNICATIONS SYSTEM

This application is a continuation of and claims the benefit of U.S. patent application Ser. No. 11/857,290, filed Sep. 18, 2007, now abandoned which is incorporated herein by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The instant disclosure relates to the field of telecommunications, and more specifically provides a highly scalable system and methods through which Internet-based communications generally, and Internet Protocol ("IP")-based telephony specifically, can be effectuated.

BACKGROUND

Conventional Voice over Internet Protocol (VOIP) system architectures are tightly coupled to the legacy Public Switched Telephone Network (PSTN). Devices known as "media gateways" send or transfer a call from a packet-based network carrying the VoIP data, such as the Internet, to the circuit-based PSTN network. These media gateways focus on translating signaling information, call routing information, and voice payloads between the two different networks and relaying such information between the networks. Media gateways have a combination of circuit switched technology and packet switched technology, and their internal structure is typically architected around call routing technology based on elements of the legacy PSTN system.

Because these media gateways are tightly coupled to the PSTN, their implementation necessitates a highly distributed architecture with many attachment points to the PSTN. In fact, conventional VoIP architectures often use the PSTN as a backbone to connect these distributed attachment points together.

SUMMARY

Unlike conventional VoIP architectures, the instant disclosure is directed to a highly scalable IP-based communication system. In an embodiment, the insertion of a circuit-switched network communications originating and terminating onto IP-based networks is avoided, thereby allowing the communication to leverage IP-based capabilities and optimizations, including, without limitation the use of advanced broadband codecs, incorporation of rich media content, and the use of advanced real time interaction and monitoring capabilities.

Some embodiments disclosed herein are directed to a scalable architecture capable of serving hundreds of thousands, and even millions of subscribers and their related devices. Unlike conventional VoIP architectures which can only handle a limited number of subscribers and the Session Initialization Protocol ("SIP") registrations (such as, for example, the SIP registrations defined in the Internet Engineering Taskforce's Request for Comments 2543 or other related and/or successor documentation) generated by their devices, some embodiments disclosed herein implement a scalable architecture which allows, for example, SIP registration and registration retransmission behavior, which is necessitated when network anomalies or other problems arise, to be handled without degrading system performance. Some embodiments can also leverage the architecture set forth herein to facilitate management of the various subscriber devices, including, without limitation, the implementation of changes and improvements to such devices such as software and/or firmware updates Some embodiments facilitate the querying of multiple E.164 Number Mapping ("ENUM") trees (as defined in Internet Engineering Taskforce Request for Comments 3761 and other related and successor documents). At present, the ENUM query module that ships with SIP Express Router ("SER"), available from http://www.iptel.org, and most other conventional VoIP software assumes the need for querying one, and only one, ENUM tree. By contrast, some embodiments disclosed herein support simultaneous or nearly simultaneous querying of multiple VoIP peering exchanges, each with their own private ENUM tree.

Additional features and advantages will be set forth in the description which follows, and in part will be apparent from this disclosure, or may be learned by practice of the invention. The objectives and other advantages of the invention will be realized and attained by the structure particularly pointed out in this written description, including any claims contained herein and the appended drawings.

It is to be understood that both the foregoing general description and the following detailed description are exemplary and explanatory and are intended to provide further explanation of the disclosed highly scalable IP-based communication system.

BRIEF DESCRIPTION OF THE DRAWINGS

The accompanying drawings, which are included to provide a further understanding of the disclosed highly scalable IP-based communication system and are incorporated in and constitute a part of this specification, illustrate various embodiments and, together with the description, serve to explain the principles of at least one embodiment of the disclosed highly scalable IP-based communication system.

In the drawings.

DETAILED DESCRIPTION

Reference will now be made in detail to embodiments of the disclosed highly scalable IP-based communication system, examples of which are illustrated in the accompanying drawings.

Figure 1:
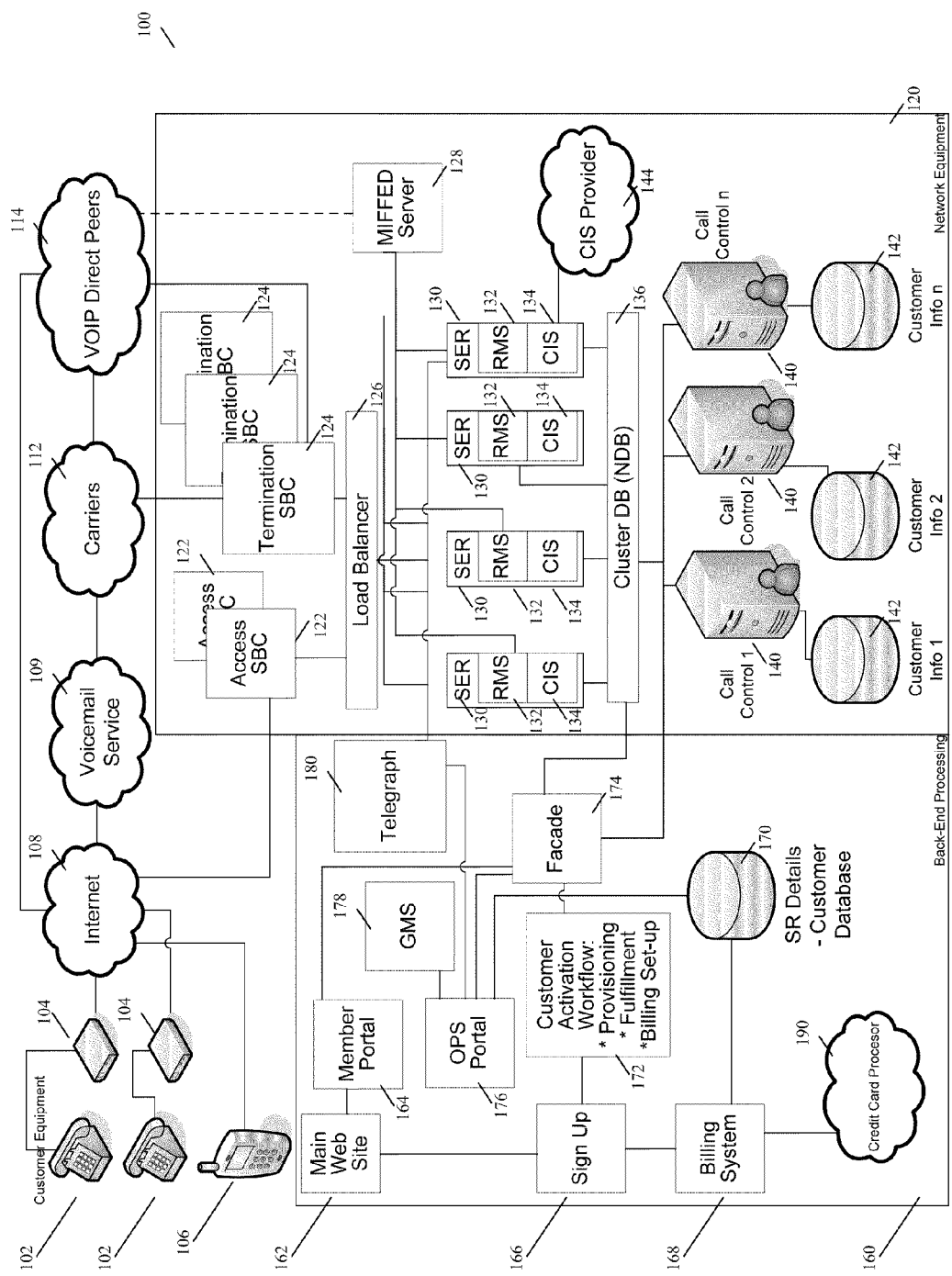
FIG. 1 is a block network diagram of an architecture through which a highly scalable IP-based communication system can be implemented.

FIG. 1 is a block network diagram of an architecture through which a highly scalable IP-based communication system 100 can be implemented. The highly scalable IP-based communication system 100 facilitates the conversion of analog voice conversations, originating or terminating at a subscriber's site, into a digital format that can be communicated across the Internet 108 or other shared network by taking advantage of a high-speed data connection, such as, without limitation, those high-speed data connections provided by fiber optic Internet service, or cable and DSL modems.

The analog to digital (A2D) and digital to analog (D2A) voice conversion can be performed using a variety of tools including, without limitation, an analog telephone adaptor (ATA) 104 and a Session Initiation Protocol (SIP) phone 106. In some embodiments, an ATA 104 is connected between an analog telephone 102 and an existing broadband connection at the subscriber's site. ATA 104 can sample the analog voice signal received from a conventional, analog telephone 102 and convert the analog voice signal into a digital signal format. This converted digital signal can then be transmitted across the broadband connection to Internet 108 or another such high speed network. ATA 104 can also receive incoming digital "calls" via the broadband connection and convert the voice component of the incoming digital call into analog signals that are passed to analog telephone 102.

Some embodiments may employ one or more SIP-capable phones 106. SIP-capable phones 106, also referred to herein as SIP phones 106, have the innate ability to perform the D2A conversion necessary such that the voice payload of the digital incoming call can be converted to an analog format that can be reproduced by one or more speakers housed within or associated with SIP phone 106. SIP phones 106 can also include the ability to perform the A2D conversion necessary to convert the subscriber's voice from its inherent, analog form into a digital format. Examples of devices which include such innate conversion capabilities include personal digital assistants (PDA's) on which appropriate software has been installed, cellular telephones, and the ATS 6011s Internet telephone distributed by America Telecom of Atlanta, Ga. The innate conversion capabilities of such devices allow SIP phone 106 to be directly connected to the broadband connection, without the need for an ATA 104. In some embodiments, the connections may be accomplished via wired or wireless communications, such as those described in the Institute for Electrical and Electronics Engineers (IEEE) 802.11 family of standards.

In some embodiments, the broadband connection will function equivalently when communicating digital voice signals, regardless of whether such signals originate from ATA 104, SIP phone 106, or another such device. For clarity, the term "digital phone" or "device" is used herein to refer to any device or combination of devices capable of converting analog voice signals into a digital format and converting digital formatted voice signals into an analog form which can be reproduced for the subscriber, and is intended to include, without limitation, ATA's 104, SIP phones 106, and similar, substitute, or successor devices.

Digital phones generally perform pulse-code modulation (PCM) sampling of an analog voice signal at a predetermined rate recommended for digitizing voice-frequency signals utilizing ITU-T standard G.711. According to the G.711 standard, analog voice signals are sampled at a rate of 8000 samples per second to create a digital voice signal in a 64 Kbit/second bitstream. Once converted into a digital format, the uncompressed bitstream is packetized. Such packetization may comprise converting the bitstream into packets compatible with the Internet Protocol or other related or successor protocols. Although the packetized bitstream is referred to herein as comprising IP packets, this term is used for clarity and is not intended to limit the instant system to a particular packet type.

Each digital phone can have associated therewith a unique identifier, such as, without limitation, a machine access code/ media access control address (MAC Address) such as that defined in the Institute for Electrical and Electronics Engineers Standard Number 802.3, an Internet Protocol address (IP Address), or the like which enables the phone to be individually addressed and identified. Each digital phone can also comprise a database or other list of subscriber and implementation specific information such as, without limitation, the IP address of an Access SBC (described below) with which the digital phone is to be associated, the telephone number associated with the digital phone, a service provider identifier, a subscriber account number, or other such information.

The IP packets are sent to the broadband connection for transmission over Internet 108 or another such network for processing by the system disclosed herein. The IP packets are routed to and processed by the instant system based on information contained in the IP packets. As described above, the digital voice payload is inserted into one or more IP packets such that the digital voice payload can be transported to its desired destination. In some embodiments, these IP packets, and the digital voice payload contained therein, are forwarded and processed through the instant system as they are received. Some embodiments of the instant system may utilize the Real-Time Transfer Protocol (RTP), as defined in Internet Engineering Taskforce Request for Comments Number 1889 or similar or successor standards, to manage the transmission of voice, video, or other multimedia data contained in the digital voice payload. In some embodiments, all components in the instant system can communicate with each other via a private IP network and utilize IP networking protocols.

The instant system comprises two general components, network equipment 120 and back-end processing equipment and systems 160. Network equipment 120 is primarily responsible for facilitating the digital calls themselves. Back-end processing equipment and systems 160 allow subscribers and administrators to control account settings and access, allow administrators to control network equipment 120, handles billing and other such business services, and the like. The description of the instant system will begin with a description of network equipment 120.

In some embodiments, voice calls to or from a subscriber are routed through one or more centralized server centers. Although described herein as though the various components of network equipment 120 are proximate to each other, it should be apparent to one skilled in the art that the various components need not be physically proximate.

In some embodiments, a subscriber-placed call can be initiated by the subscriber using subscriber digital telephone 104/106 to dial a telephone number corresponding to the intended destination, selecting the destination telephone number from an address book associated with subscriber digital telephone 104/106, selecting the destination phone number from a list of recently received and/or placed calls, or the like. Digital telephone 104/106 uses the destination telephone number and other such call initiation information associated with the call to create a SIP message. The SIP message is transmitted from the broadband connection to an Access Session Border Controller (Access SBC) 122 located at a server center. Exemplary SBC's include, without limitation, the nCite™ series of Session Border Controllers distributed by Netrake of Plano, Tex. The Access SBC can act as a first "layer" of the instant system and can provide several services to the instant system, including monitoring the availability of subscriber phone 104/106. In such embodiments, calls originating from the subscriber, as well as incoming calls to the subscriber, can pass through Access SBC 122. In some embodiments, Access SBC 122 can effectuate subscriber digital phone availability monitoring by coordinating and processing SIP registration messages that are sent from the subscriber digital phones to the instant system.

Although the instant system is described herein as comprising a single Access SBC 122, it is anticipated that a plurality of Access SBC's 122 will be used in many embodiments of the instant system. In some embodiments, one or more subscriber digital telephones 104/106 may be assigned to a specific Access SBC 122. In the case of an Access SBC in such an embodiment, the Access SBC 122 may comprise a database or other list of the unique identifiers associated with each of subscriber digital telephones 104/106 for which it is responsible. This allows Access SBC 122 to limit the number of subscriber digital telephones 104/106 with which it must facilitate communication to a number that can be handled by that Access SBC 122. Because both the Access SBC's 122 and the subscriber digital telephones 104/106 can be reprogrammed dynamically by merely altering their respective databases, the instant system can quickly and easily adapt to hardware-type failures, such as an unexpected failure of one or more Access SBC's 122. The instant system can further be dynamically adapted to permit planned maintenance of one or more Access SBC's without interrupting a subscriber's ability to place or receive calls. Still further, in some embodiments the Access SBC assignments may be handled by an intelligent assignment system which dynamically balances the number of subscriber digital telephones assigned to, and/or reallocates subscriber digital telephones assigned to, each Access SBC 122 based on the load experienced by each Access SBC 122.

When an Access SBC 122 receives a SIP call request from an associated subscriber digital phone 104/106, the Access SBC 122 passes the SIP call request to a Call Control Node (CCN) 140 via Proxy/SIP Express Router (SER) 130 and load balancer 126. Load balancer 126 allows the call initiation, call termination, digital telephone registration, and other such low-level communications experienced by the instant system to be dynamically spread across a plurality of SER 130's in the instant system, thereby allowing the instant system to provide reliable and fast service.

In some embodiments, SER 130 can function as a proxy and second "layer" to the instant system, and can direct call requests to CCN 140 based on an identifier associated with the subscriber's user profile. In some embodiments, SER 130 can store a variety of configuration information in Cluster Database 136, such as, without limitation, subscriber to CCN assignments, last successful registration of a digital telephone with a CCN, last successful "keep alive" registration message received by SER 130 for a digital telephone, subscriber account status and features, and the like. By way of example, without limitation, a subscriber can be assigned to a specific CCN 140 based on the geographic location of the caller's billing address, based on route information, or the like. In some embodiments, the subscriber CCN 140 assignments are made on a round-robin basis, thereby providing a level of load balancing in the system. In some embodiments, SER 130 can store such assignments in Cluster Database 136.

As with Access SBC's 122 and subscriber digital telephones 104/106, because the subscriber CCN 140 assignments are stored in a database (i.e., associated with the subscriber's user profile), the subscriber CCN 140 assignments can be dynamically changed to accommodate planned and unplanned maintenance or other service interruptions. Still further, in some embodiments the subscriber CCN 140 assignments may be handled by an intelligent assignment system which dynamically balances the number of subscribers assigned to, and/or reallocates subscribers assigned to, each CCN 140 based on the load experienced by each CCN 140. Exemplary CCN's include, without limitation, the Synergy line of call control nodes distributed by Sylantro Systems of Campbell, Calif. CCN 140 is described in more detail below.

The instant system can utilize different call routing schemes depending on the originator and recipient of a call, and such routing schemes can be controlled by the Route Management System (RMS) 132 component of SER 130. As such, in some embodiments CCN 140 may offload route identification and selection to alternative components within the instant system, such as RMS 132. As described below, RMS 132 is capable of aggregating routing information from a variety of sources such as, without limitation, carriers 112 and MIFFED server 128, to determine available routes to a destination. RMS 132 may also comprise a route selection engine which determines a preferred route from the available routes. Such determination can be based on a variety of factors including, without limitation, the number of network "hops" to reach a destination, quality of service metrics associated with each route, rates charged by the carrier(s)/VoIP partners(s) involved in processing the call, network type for the destination, and the like. By way of example, if a call is being made to another subscriber of the instant system, RMS 132 will automatically select a route which allows the call to be directed to an appropriate Access SBC 122 within the instant system. If the call is being made to someone outside the instant system, RMS 132 will route the digital voice data to an external network, such as PSTN 112 or to a VoIP peer 114.

Once a preferred route is determined, RMS 132 can return this route to CCN 140, which initiates communications with an appropriate Termination SBC 124. In some embodiments, a group of carrier-facing Termination SBC's 124 interact with carrier partners who provide access to their respective portions of PSTN 112. In some embodiments, interactions between the carrier partners and Termination SBC's 124 may be done over IP networks and utilizing IP protocols, wherein the SIP information is used for call signaling and other functions until the call is received by a media gateway in the carrier's domain, at which point the call is converted by the carrier into a format appropriate for PSTN 112. Communication with direct VoIP peers can be similarly handled via a Termination SBC 124. In some embodiments, interactions between direct VoIP peers is done over IP networks, as described below.

CCN 140 can be seen as a third "layer" to the instant system. CCN 140 can handle all call set up/tear down functions and establish connections between the originating caller, the appropriate network, and the receiving caller. CCN 140 can also keep track of call states within the instant system, validate that call requests are coming from active subscribers, and other such functions. Once call initialization signaling is complete and a call is successfully set up, transmission of the digitized conversation can take place.

CCN 140 can coordinate and provide signaling that facilitates the completion of incoming calls from external systems and networks. In some embodiments, a call from PSTN 112 can be converted to a SIP call request, which is transferred to the instant system by way of a carrier facing Termination SBC 124. The SIP call request can be transferred from the Termination SBC 124 to CCN 140 by way of SER 130. As part of the transfer between SER 130 and CCN 140, the CIS component 134 of SER 130 can associate information from a caller information service, such as, without limitation, caller ID information, caller name, calling party number, and the like, with the SIP call request. These functions can be supported by the ability of CIS 134 to query third party services 144 to acquire such information. By way of example, without limitation, CIS 134 can obtain the caller name for Caller ID purposes by querying third party service 144 and supplying the telephone number associated with the incoming call which is received as part of the SIP signaling message generated by Termination SBC 124 when carrier 112 passes a call to the SBC. CIS 134 can, in turn, insert the Caller ID information into the SIP signaling messages, and the amended SIP signaling messages can be passed to the CCN by SER 130.

CCN 140 can also route to voicemail any unanswered incoming calls, assuming voice mail has been activated by the subscriber. Such voicemail services may be provided by a CCN, or by an external voicemail service provider 109. In some embodiments, CCN 140 comprises software that runs on one or more general purpose servers within the instant system, such as the suite of call control software distributed by Sylantro Systems.

Once an outgoing call request is successfully processed through components of the instant system and a call is set up, the digital voice data for the call is sent from subscriber digital phone 104/106, through subscriber's broadband connection to the Access SBC 122 associated with the subscriber. From there, if the call is to another subscriber of the instant system, the caller's Access SBC routes the voice data directly to the destination subscriber's Access SBC 122, which in turn routes the voice data to the destination subscriber's digital telephone. If the call is to a party who is not a subscriber to the instant system, the subscriber's Access SBC can route the call directly to an appropriate Termination SBC 124, if such Termination SBC's are present in the system. In embodiments where Termination SBC's are not used between the instant system and VOIP Peers 114, the voice data may be relayed from the subscriber's Access SBC directly to an appropriate VOIP peer. In the event a call is directed to a person who is also using VoIP but is not a subscriber to a VoIP Peer 114, the call can be routed to the person by way of Termination SBC 124 and an appropriate carrier 112.

Unlike calls to subscribers on non-peer networks, which must be routed through PSTN 112, calls routed to peered VoIP providers stay in a packetized form. This allows a variety of call-related information to be preserved and utilized throughout the call, and allows the instant system to take advantage of advanced features enabled by the digital nature of the voice data.

Each conventional VoIP provider or VoIP peering exchange service typically implements their own ENUM tree, because it is assumed that all calls outside the VoIP provider's network will be routed through the PSTN. However, the instant system allows for the interoperation of a plurality of VoIP providers, and as a result, utilizing information from these multiple traditional ENUM architectures can become problematic.

As described above, ENUM trees are defined in Internet Engineering Taskforce Request for Comments 3761, and SER 130, which comprises publicly available software designed to provide VoIP routing by leveraging such ENUM trees, has been implemented with the assumption that only one ENUM tree is available. This assumption significantly hampers a VoIP provider's ability to peer with other VoIP providers. The instant system overcomes this inherent shortcoming by providing a multiplexing proxy daemon (which can be implemented as part of MIFFED Server 128) that appears to SER as though it were a standard caching nameserver but which in fact synthesizes an answer set based on queries from multiple ENUM trees accessible to the server.

This architecture raises a complication that is inherent to using multiple ENUM trees. In many cases a query to two or more ENUM trees will result in ambiguous results about how a caller should interpret the combined results when there is no coordination between the trees. By way of example, without limitation, if two ENUM trees have a record for a particular telephone number and they both have the same Priority but different Rewrite fields, then the SER component could end up routing the call randomly between two different SIP providers. The conventional ENUM rule for dealing with records with the same Order and Preference is to pick randomly, thereby providing a rudimentary load balancing mechanism. By contrast, some embodiments of MIFFED Server 128 allow ENUM trees to be ranked within the MIFFED configuration. Thus, if one ENUM tree is ranked above another, then the preference value for any NAPTR records from the higher ranked ENUM tree will be rewritten so that the resulting preference value is higher than any NAPTR returned from any lower ranked ENUM tree. In the case where no preference is provided the MIFFED server will issue a non-fatal configuration warning and will forward the unchanged NAPTR set.

One task of MIFFED server 128 is to multiplex at least two ENUM trees into a one so that a SER instance still views the world as having only one ENUM tree to query. Since ENUM can be seen as a set of conventions for using the Domain Name Service (DNS) protocol, this task breaks down into two distinct parts: compliant DNS behavior and compliant ENUM behavior.

Although it can be assumed that the querier is a SER instance, which implies that the querier may not require MIFFED Server 128 to possess full DNS functionality, there are particular ways in which any basic DNS server must behave. This includes reporting error codes correctly, gracefully refusing EDNS0 queries, and dealing with incorrectly configured/implemented clients. In addition to the basic DNS behavior, certain ENUM-specific semantics should be supported to implement the multi-tree ENUM server in MIFFED Server 128. Such semantics include, without limitation, correctly rewriting preference values to denote ranked ENUM trees, dealing with incorrect ENUM responses from third party ENUM trees, and allowing for future development to take advantage of rewriting other NAPTR fields.

Figure 2:
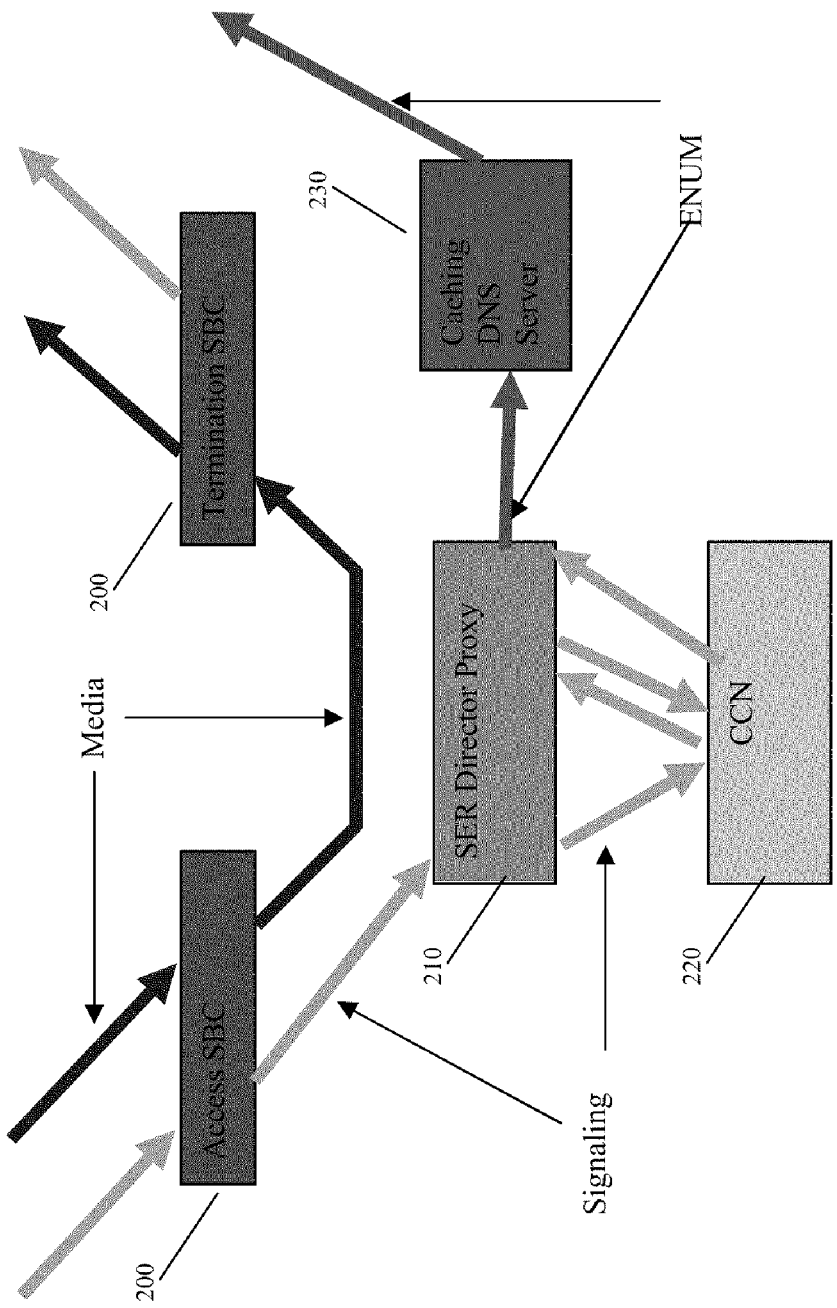
FIG. 2 is a block diagram illustrating a traditional SER ENUM flow.

FIG. 2 illustrates a traditional SER ENUM process flow. In FIG. 2, SBC 200 queries CCN 220 by way of SER Director Proxy 210. SER Director Proxy 210 first queries CCN 220 to determine whether the telephone number is one serviced by the instant system. If the request is for a telephone number serviced by the instant system, then SER Director Proxy 210 requests appropriate call control information from CCN 220. If the telephone number is not one serviced by the instant system, SER Director Proxy 210 queries the ENUM tree of Caching DNS Server 230, which maintains an internal ENUM tree.

Figure 3:
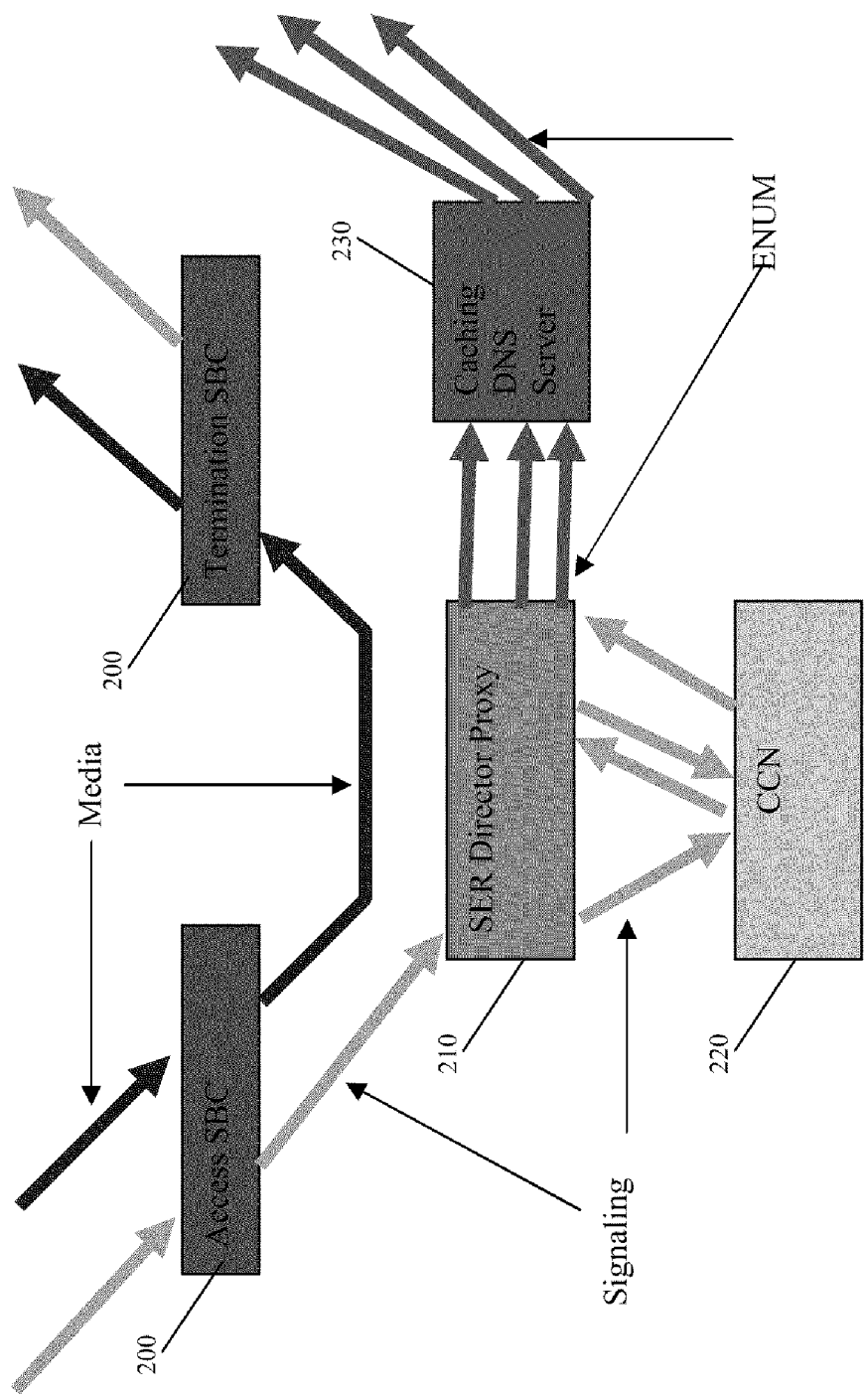
FIG. 3 is a block diagram illustrating an alternative SER ENUM flow capable of simultaneously polling a plurality of ENUM trees.

FIG. 3 illustrates an alternative SER ENUM process flow that is capable of multiple, parallel ENUM queries to multiple peering partners. In FIG. 3, SBC 200 queries CCN 220 by way of SER Director Proxy 210 to obtain routing and other call-related information. SER Director Proxy 210 in turn queries CCN 220 to determine whether the telephone number being called is one serviced by the instant system. If the request is for a telephone number serviced by the instant system, then SER Director Proxy requests appropriate call-related information from CCN 220. If the telephone number is not one serviced by the instant system, SER Director Proxy 210 queries the ENUM tree of a plurality of Caching DNS Servers 230, each of which maintains an internal ENUM tree for its network. SER Director Proxy 210 can then determine which of the peering partners services the telephone number and can obtain additional information from such VoIP peering partners. Appropriate information is then returned to Access SBC 200, which begins forwarding the call-related IP packets based on the information.

Figure 4:
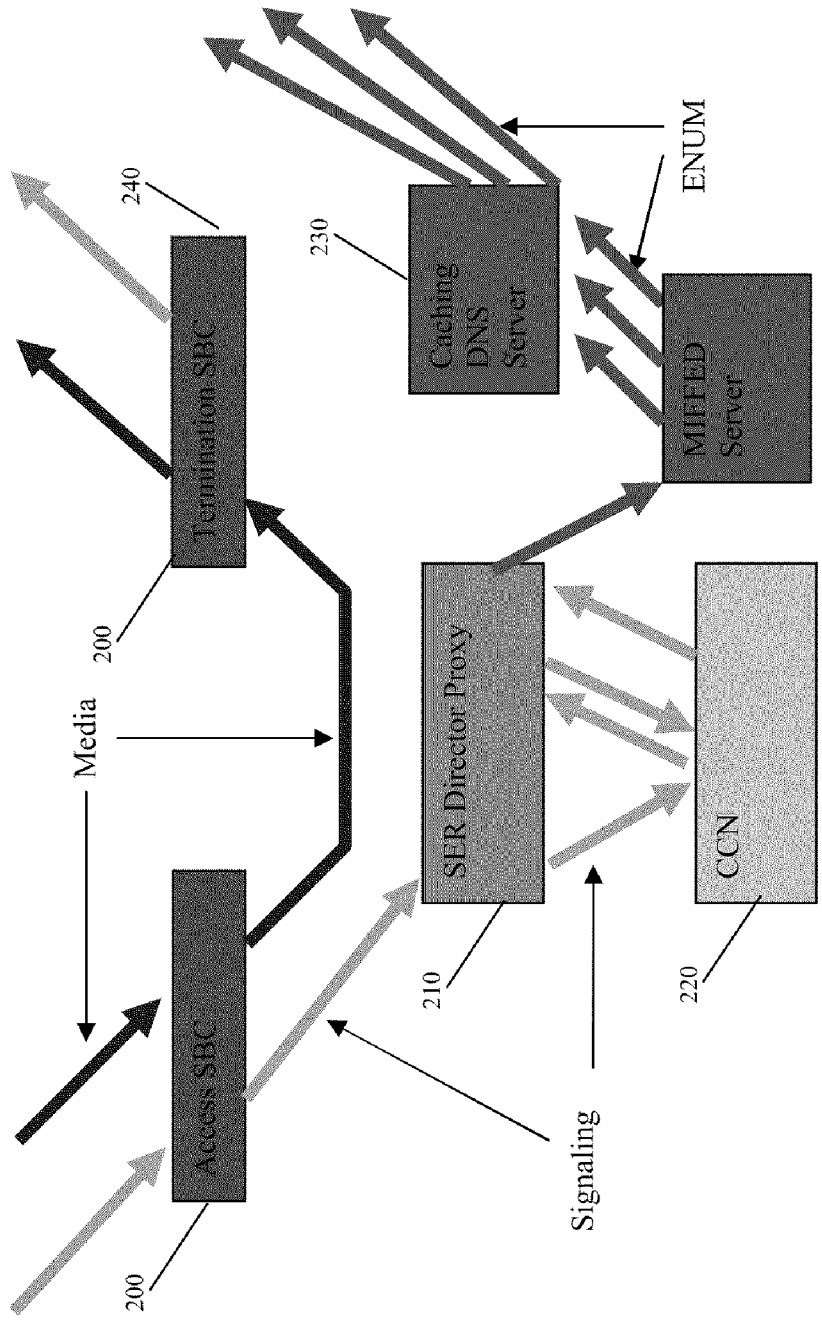
FIG. 4 is a block diagram illustrating an alternative SER ENUM flow capable of simultaneous polling a plurality of ENUM trees and providing a layer of abstraction between the ENUM tree architecture and a SER Directory Proxy.

FIG. 4 illustrates an alternative SER ENUM process flow capable of multiple, parallel ENUM queries to multiple peering partners. In FIG. 4, SBC 200 queries CCN 220 by way of SER Director Proxy 210 to obtain routing and other call-related information. When SER Director Proxy 210 receives the request on behalf of CCN 220, SER Director Proxy 210 can queries CCN 220 to determine whether the telephone number is one serviced by the instant system. If the request is for a telephone number serviced by the instant system, then SER Director Proxy 210 requests appropriate call-related information from CCN 220. If the telephone number is not one serviced by the instant system, SER Director Proxy 210 queries MIFFED Server 240. MIFFED Server 240 can simultaneously, or nearly simultaneously, poll a plurality of Caching DNS Servers 230, each of which maintains an ENUM tree for its respective VoIP peering partner. MIFFED Server 240 may also obtain routing data from one or more carriers. As described above, MIFFED Server 240 can handle organizing the various routing information and any conflicts therein. MIFFED Server 240 can then provide appropriate call-related information to SER Director Proxy 210 which can forward the information to CCN 220, along with any preference or priority attributes associated with each route. CCN 220 can, in turn, provide the selected route to Access SBC 200 via SER Director Proxy 210. Access SBC 200 can then begin forwarding the call-related IP packets based on the routing information.

In the embodiment illustrated in FIG. 4, MIFFED Server 240 may rely on standard DNS fault tolerance mechanisms. The SER ENUM module can be given an ENUM tree name which will use two or more name server ("NS") records in the authoritative DNS to point at MIFFED server instances (e.g., separate MIFFED Servers 250). If a MIFFED instance fails, the operating system DNS routines of the querying machines will therefore fail over to another, operative MIFFED instance.

Figure 5:
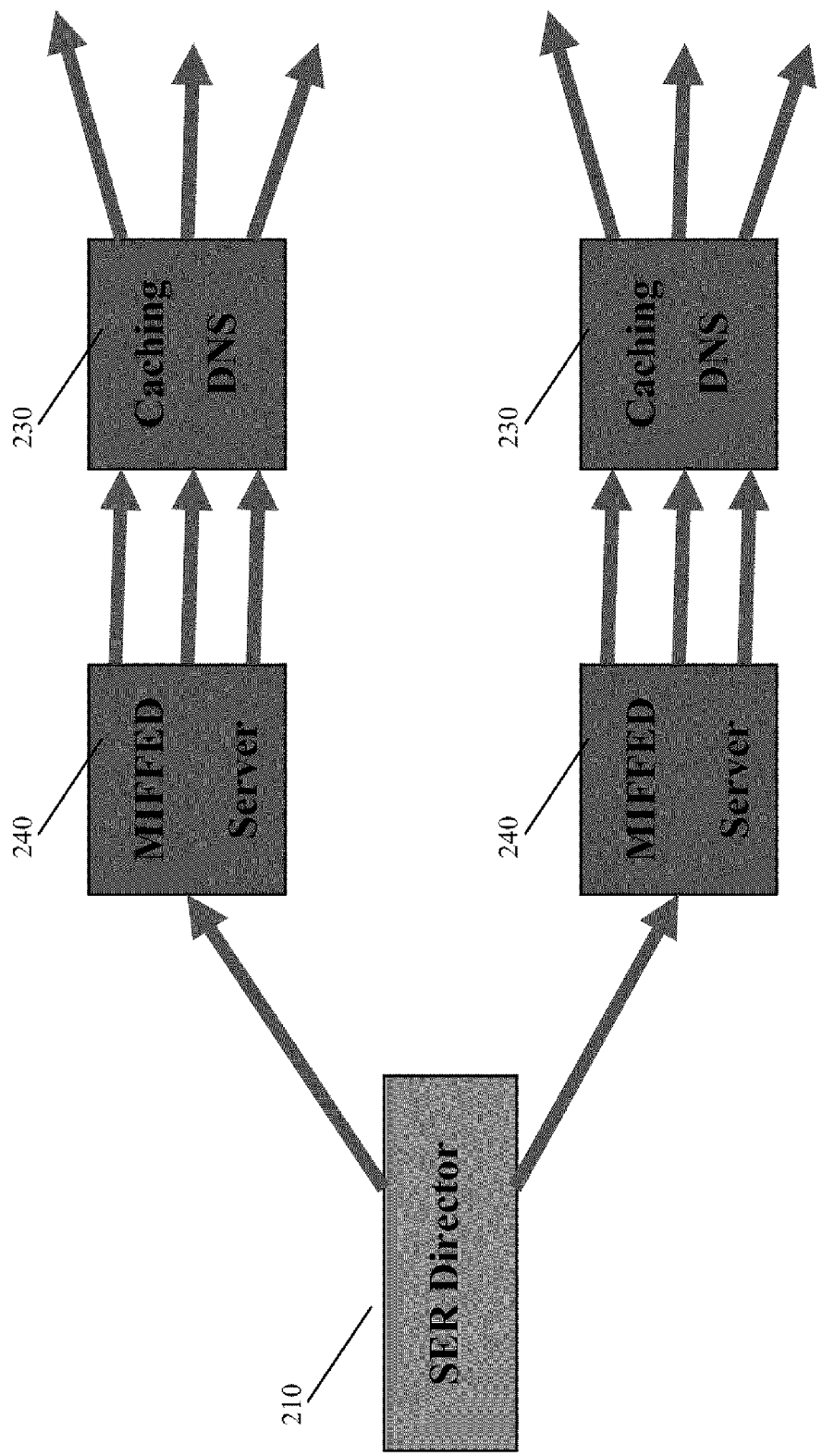
FIG. 5 is a block diagram illustrating an alternative MIFFED server architecture which utilizes a plurality of MIFFED servers.

In some embodiments, MIFFED Server 240 will not contain full DNS resolution or caching functionality. Instead, each MIFFED Server 240 instance can sit in front of a standard DNS full-resolving cache such as BIND or DNSCACHE, as illustrated in FIG. 5.

In some embodiments, configuration parameters associated with each MIFFED Server 240 will be periodically read from a database by the MIFFED Server. This will allow Ops Portal 176 to easily update the MIFFED Server configurations should it be necessary, including, without limitation, the disabling of queries directed to specific ENUM trees. It also allows an individual MIFFED Server 240 to recover from any unintentional or malicious data corruptions occurring at the server with only minimal impact on the system as a whole.

In some embodiments, MIFFED Server 240 can translate ENUM tree names from a source to a destination and back. That is, if a query for 8.9.6.6.8.4.3.7.1.9.1.e164.arpa is sent by SER Director 210, a MIFFED Server 240 multiplexed query should be changed to match the destination tree name such as 8.9.6.6.8.4.3.7.1.9.1.thevpf.com, and vice versa. In some embodiments, non-ENUM tree queries should flow through the MIFFED Server 240 unimpeded, but some embodiments of MIFFED Server 240 may log such queries as an error. MIFFED Server 240 may wait a fixed period for the results of ENUM queries before the query times out. If a query times out, any collected answers can be returned without waiting on responses from any additional ENUM trees. If no answers have arrived with in the prescribed duration, an RCODE 3 error can be returned. Any received RCODE 3 errors can be ignored if any other set of queries yielded a positive result.

In some embodiments, MIFFED Server 240 can change NAPTR preference values on collected answers, thereby allowing a service provider or other implementer of the instant system to rank ENUM trees by preference. In some embodiments, ENUM trees lacking a specific preference can receive the lowest available preference by default.

In some embodiments, each instance of MIFFED Server 240 can keep statistics data and expose this data via Simple Network Management Protocol (SNMP). To help reduce storage an other requirements, the statistics data may be limited to data covering a fixed period of time, such as the preceding 5 minutes of operation and/or preceding 24 hours of operation. Such statistics may include, without limitation, the number of source ENUM queries (queries from SER), the number of destination ENUM responses that are positive, the number of destination ENUM responses that are negative, the number of answer sets containing at least one positive answer, the number of answer sets containing no positive answers, the number of destination ENUM timeouts, and the number of non-ENUM source queries. In some embodiments, MIFFED Server 240 may comprise a configuration option which allows the statistics to be written to a log, if such a log is enabled. In some embodiments, MIFFED Server 240 may also log every destination ENUM timeout as an error. In some embodiments, MIFFED Server 240 may track the number of positive answers from each destination ENUM tree, as well as the total number of server timeouts from each destination ENUM tree.

Some embodiments of MIFFED Server 240 may be implemented with a database abstraction layer, such as that provided by the Hibernate Java library, thereby allowing MIFFED Server 240 to access data stored in a variety of data formats and databases. Some embodiments of MIFFED Server 240 may be written in Java conformant to the 1.5 JDK (Java 5), and may rely on several standard Java libraries, including, without limitation, the following libraries:

java.nio.—Because embodiments of MIFFED Server 240 can be seen as multiplexing forwarders, such embodiments of MIFFED Server 240 will need to listen on many ports simultaneously. This can be accomplished using java.nio and selectors.

Spring—MIFFED Server 240 can use the Spring framework to glue the various modules together.

Dnsjava—MIFFED Server 240 can utilize this library to provide the DNS wire protocol conversion methods.

Log4j—Log4j can facilitate the data logging described herein.

JMX—This library can allow MIFFED Server 240 to support SNMP.

Some embodiments of MIFFED Server 240 will comprise software, which can be encapulated into separate JARs based on the functionality associated therewith. Examples of such JARs include, without limitation:

Server—the classes for running MIFFED Server 240.

Support—classes that can be used to read and write configuration information in the database and read and write statistics information in the database.

Client—classes that can create ENUM queries for diagnostic purposes.

Referring again to FIG. 1, the instant system also comprises a plurality of back-end processing components 160. The functionality of these components will be described in more detail the following examples. Although illustrated and described herein as discrete components, it is specifically contemplated that the functions described herein can be combined into one component, or diversified across additional components, and that such changes would not depart from the spirit or the scope of the instant highly scalable IP-based communication system.

The back-end processing components are perhaps most easily described in terms of two examples. A first example is the registration process that might be experienced by a new subscriber. A second example is a means by which the digital telephones can be managed. These examples are provided for the purposes of illustration, and are not intended to limit the interpretation of the disclosed highly scalable IP-based communication system or the appended claims.

To begin using the instant system, a prospective subscriber can visit a world wide web site ("web site") 162 associated with a service provider implementing the instant system to indicate his or her desire to initiate service with that service provider. In some embodiments, if the prospective subscriber does not currently have a digital telephone, the service provider may provide such a device at a reduced price in an effort to induce new subscribers. The new subscriber will click on or otherwise interact with portions of web site 162 to initiate the sign-up process (illustrated in FIG. 1 as sign-up 166). As part of the sign-up process (also referred to as customer activation workflow 172), the customer enters a variety of information. Such information may include, but is not limited to, a credit card number or other payment information, a billing address, the customer's name, a desired service plan, the MAC address or other unique identifier associated with a subscriber device (if the prospective subscriber already has such a device), and the like. Once entered, the customer's information can be stored in customer database 170. In some embodiments, customer database 170 is separate from customer info databases 142 and separated from the networking equipment 120 by one or more firewalls or other security devices. This allows customer database 170 to house more sensitive information, such as customer billing information, calling patterns, and the like. Billing system 168 may verify any credit card or other payment information through one or more credit card processors 190 prior to activating the prospective subscriber's account.

In some embodiments, once the prospective subscriber's account is activated, the subscriber can utilize Member Portal 164 to access a variety of subscriber-accessible functions. Such functions may be provided by Facade 174, which in some embodiments can provide an API-like interface through which both service provider operators and subscribers can access various components of the instant system. By way of example, without limitation, Facade 174 may allow a subscriber to modify his or her account information (which may be stored in Customer Database 170), view call logs (which may be stored, for example, in Customer Info Databases 142), access voicemails (which may also be stored, for example, in Customer Info Databases 142), review text messages addressed to the subscriber and received by the instant system (such messages may also be stored in Customer Info Databases 142), add/remove the digital telephones associated with the subscriber's account, and the like by way of Member Portal 164. The use of an API-like interface such as Facade 174 can be advantageous as it allows the underlying components to be replaced with other, alternative and/or advantageous components, without necessitating the rewriting or reconfiguration of member portal 164, or any of the sign-up components and workflow.

Figure 10:
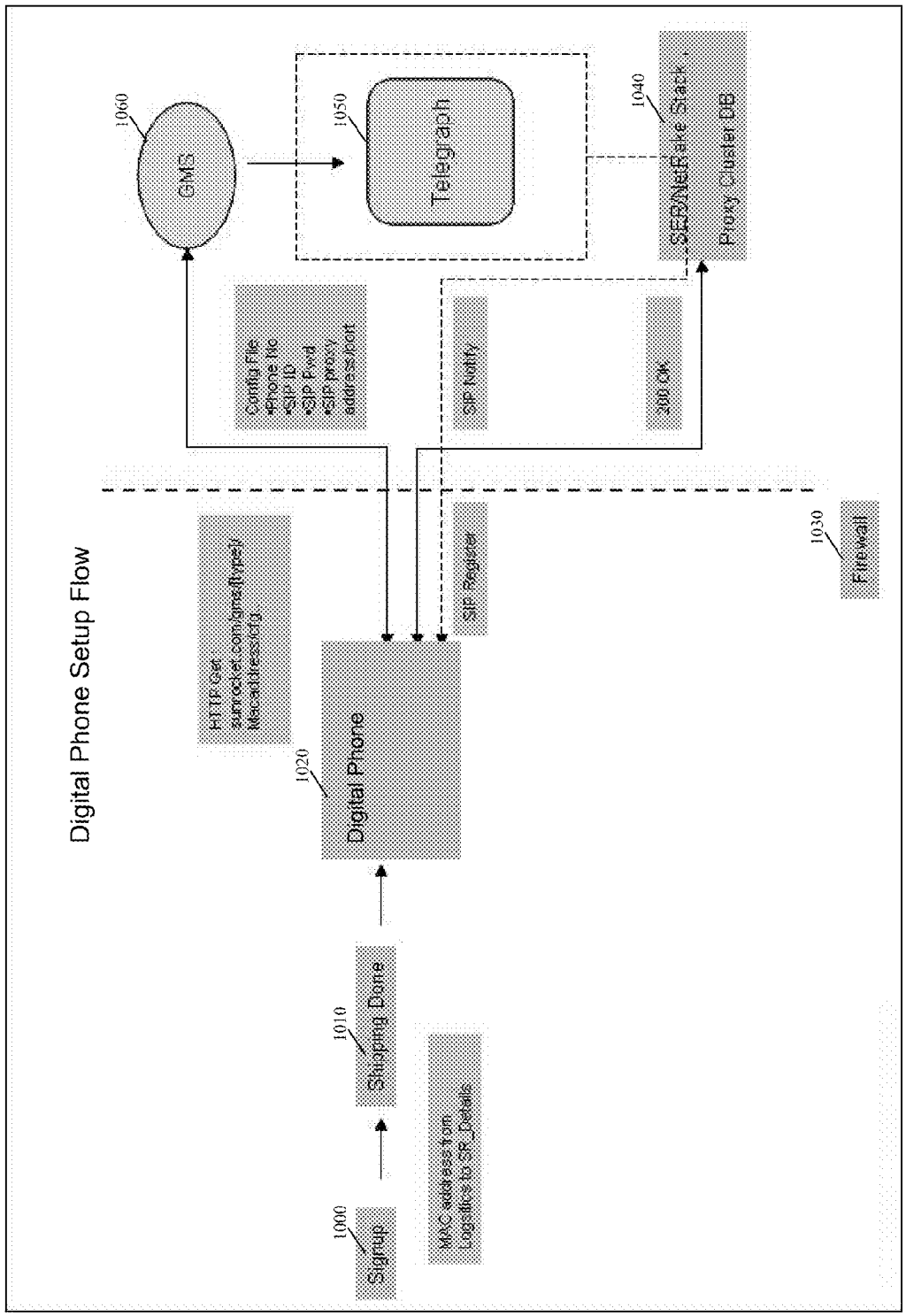
FIG. 10 is a block diagram providing an overview of an exemplary SIP device initial sign-up, configuration, and set-up process.
Figure 1:
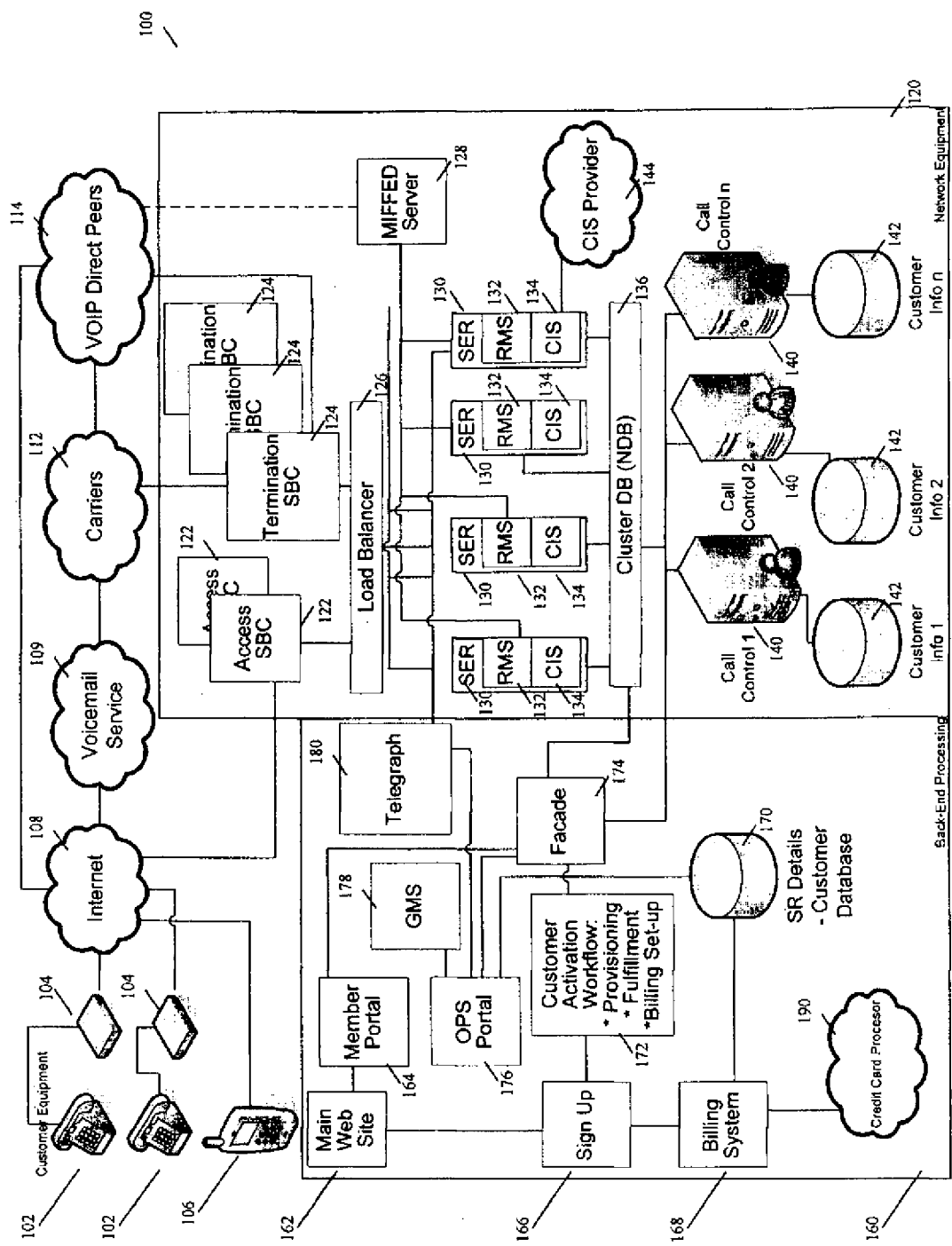
Figure 2:
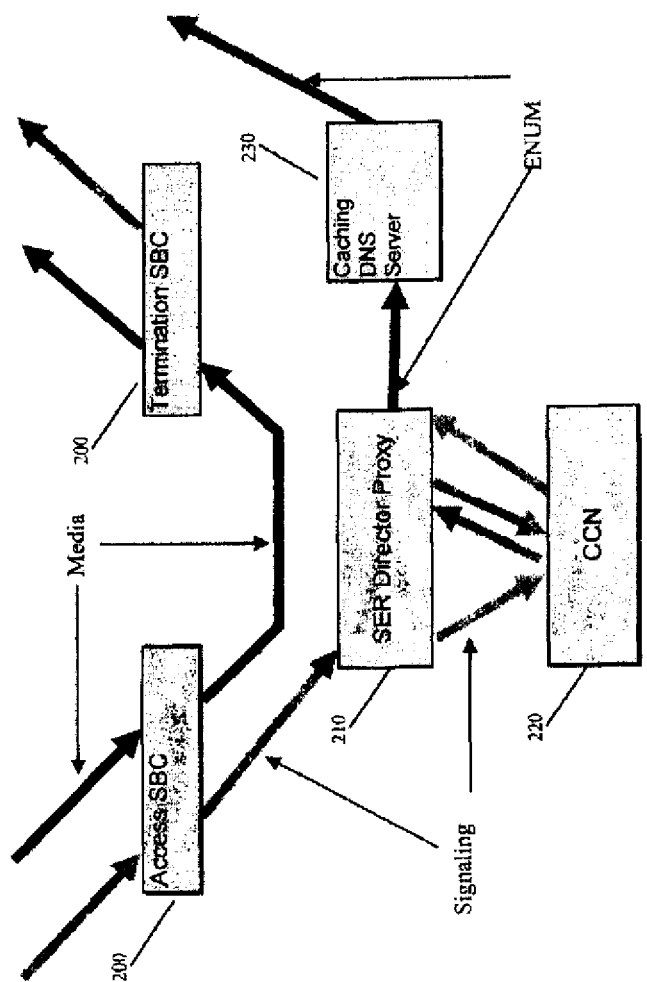
Figure 3:
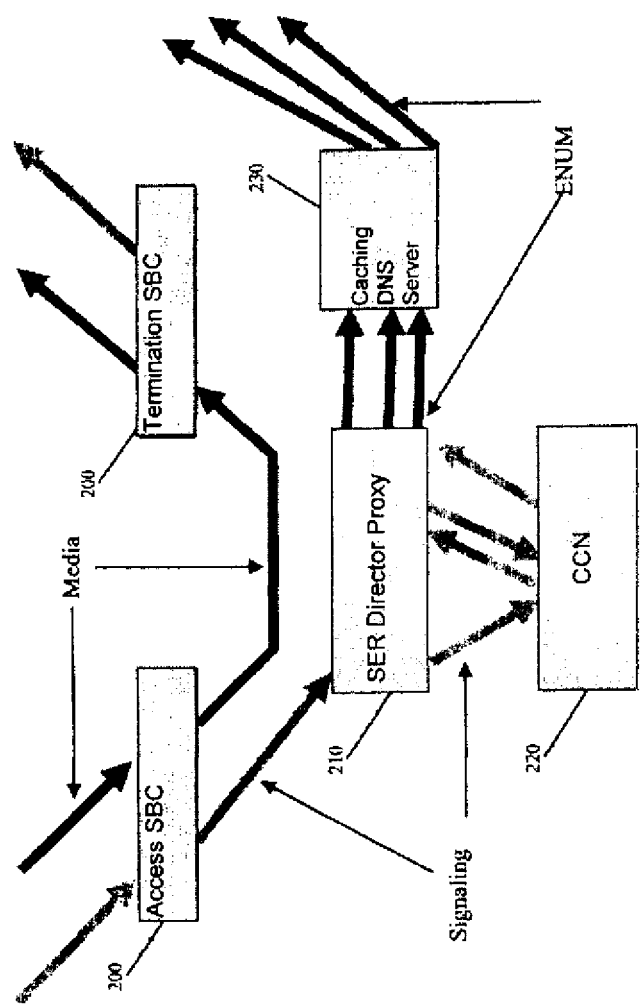
Figure 4:
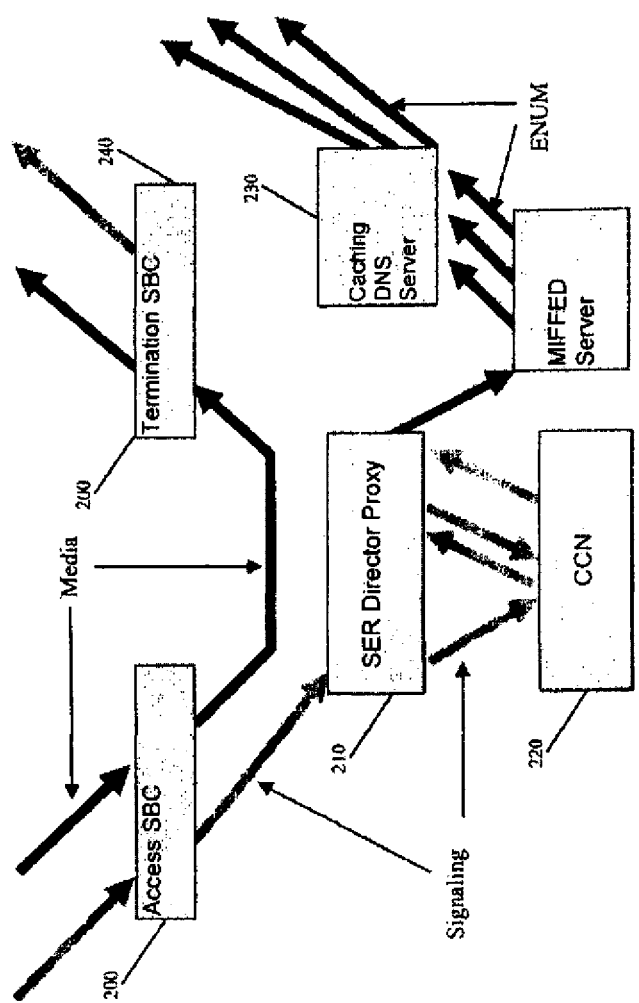
Figure 5:
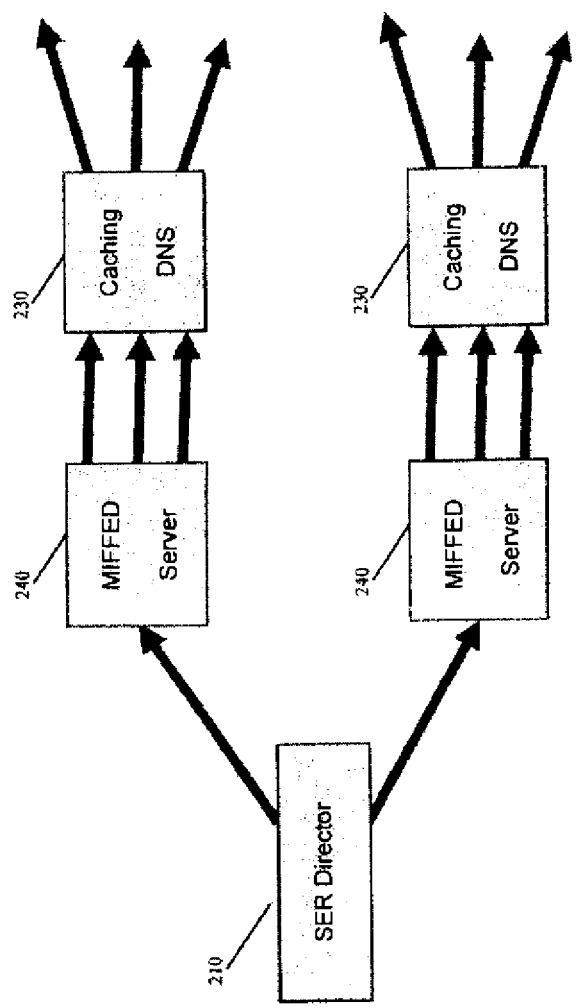
Figure 6:
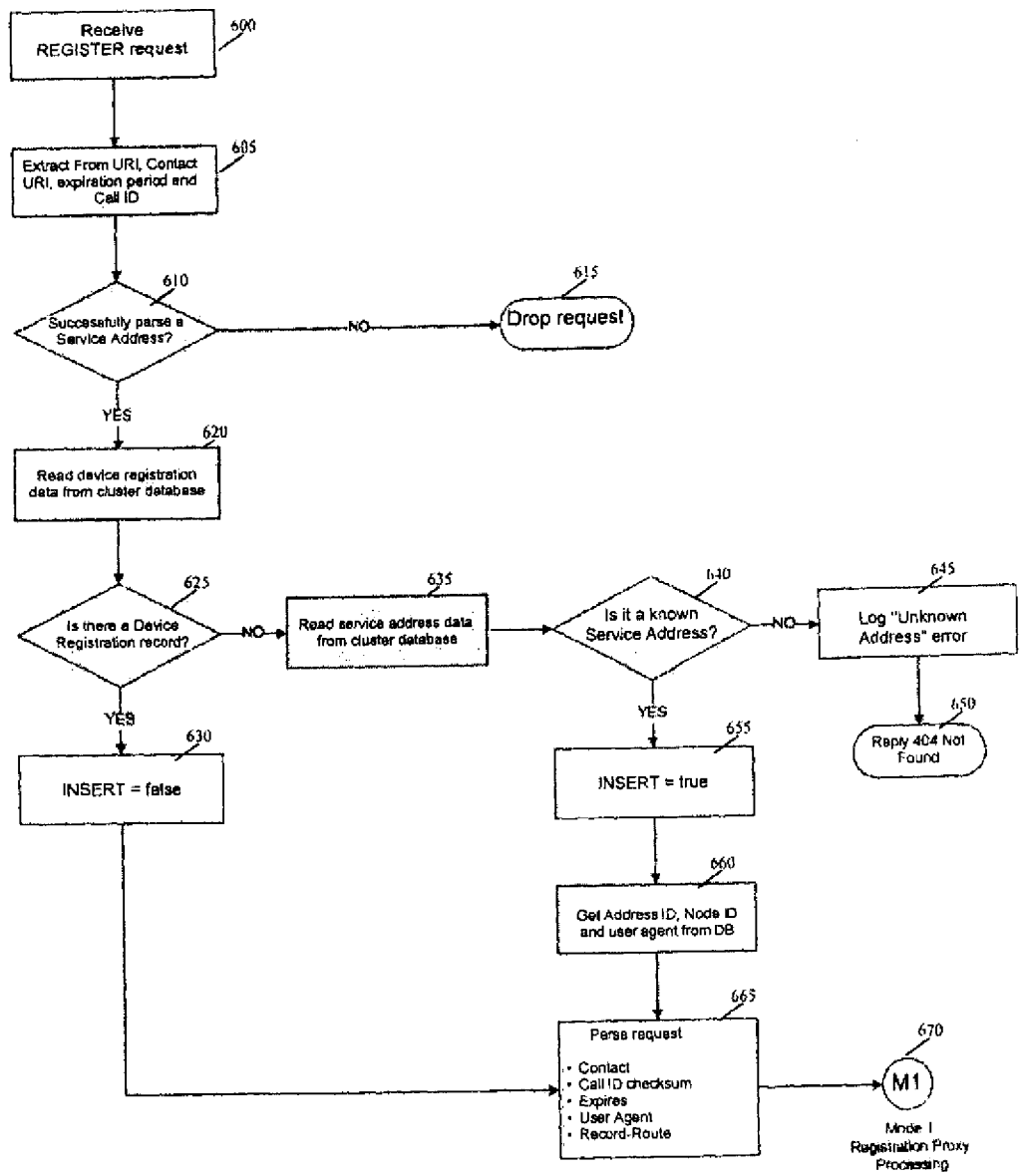
Figure 7:
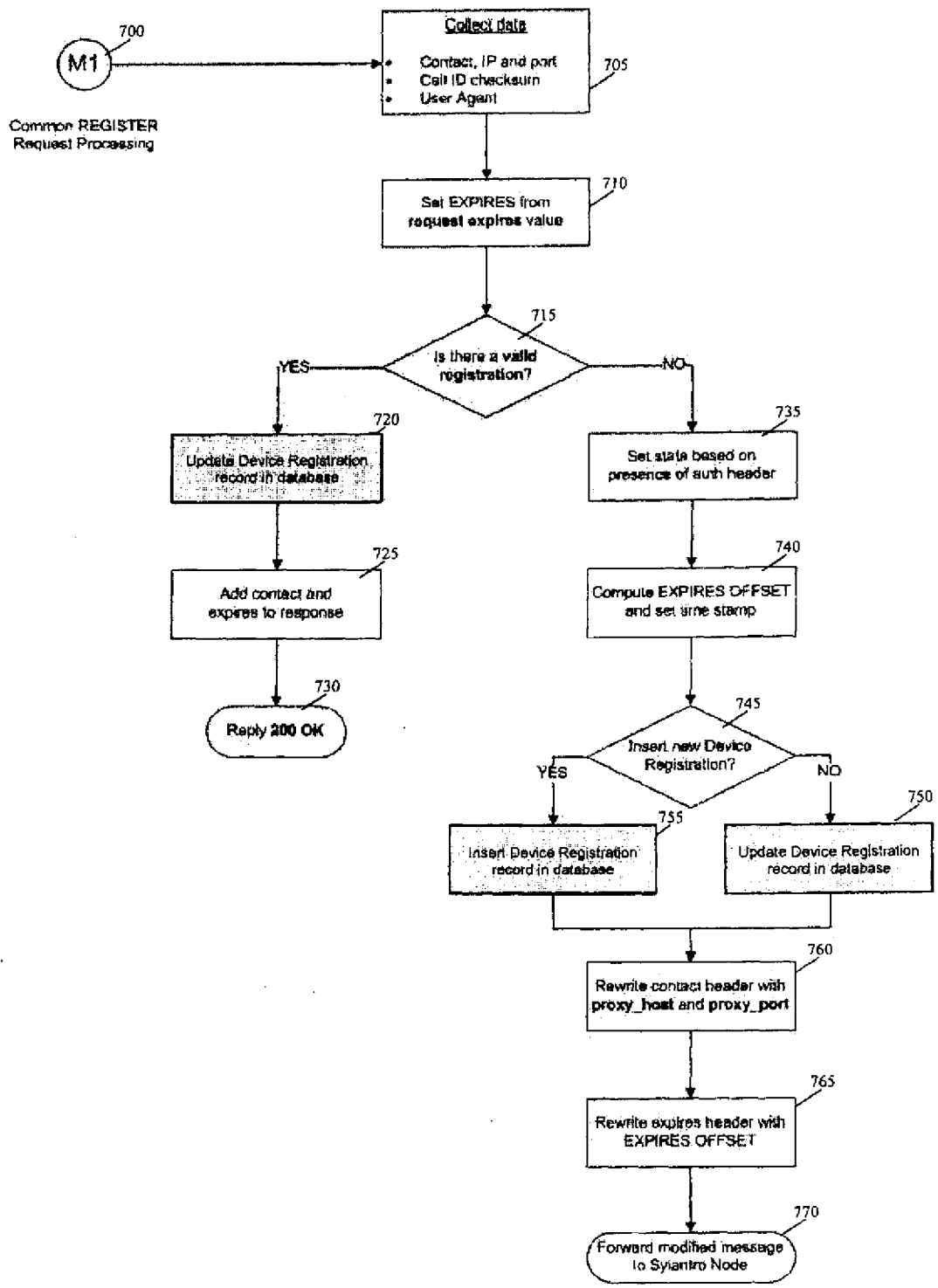
Figure 8:
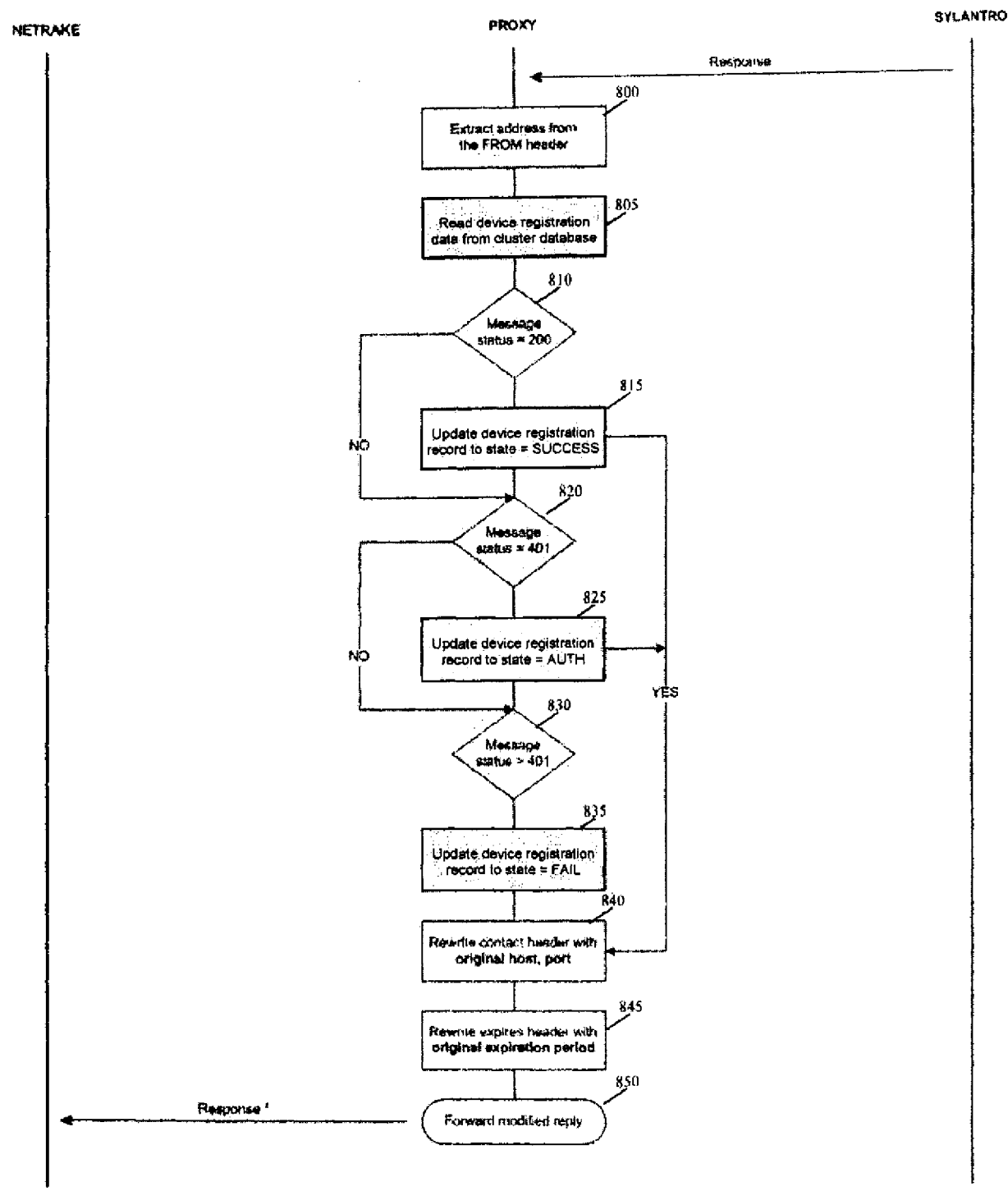
Figure 9:
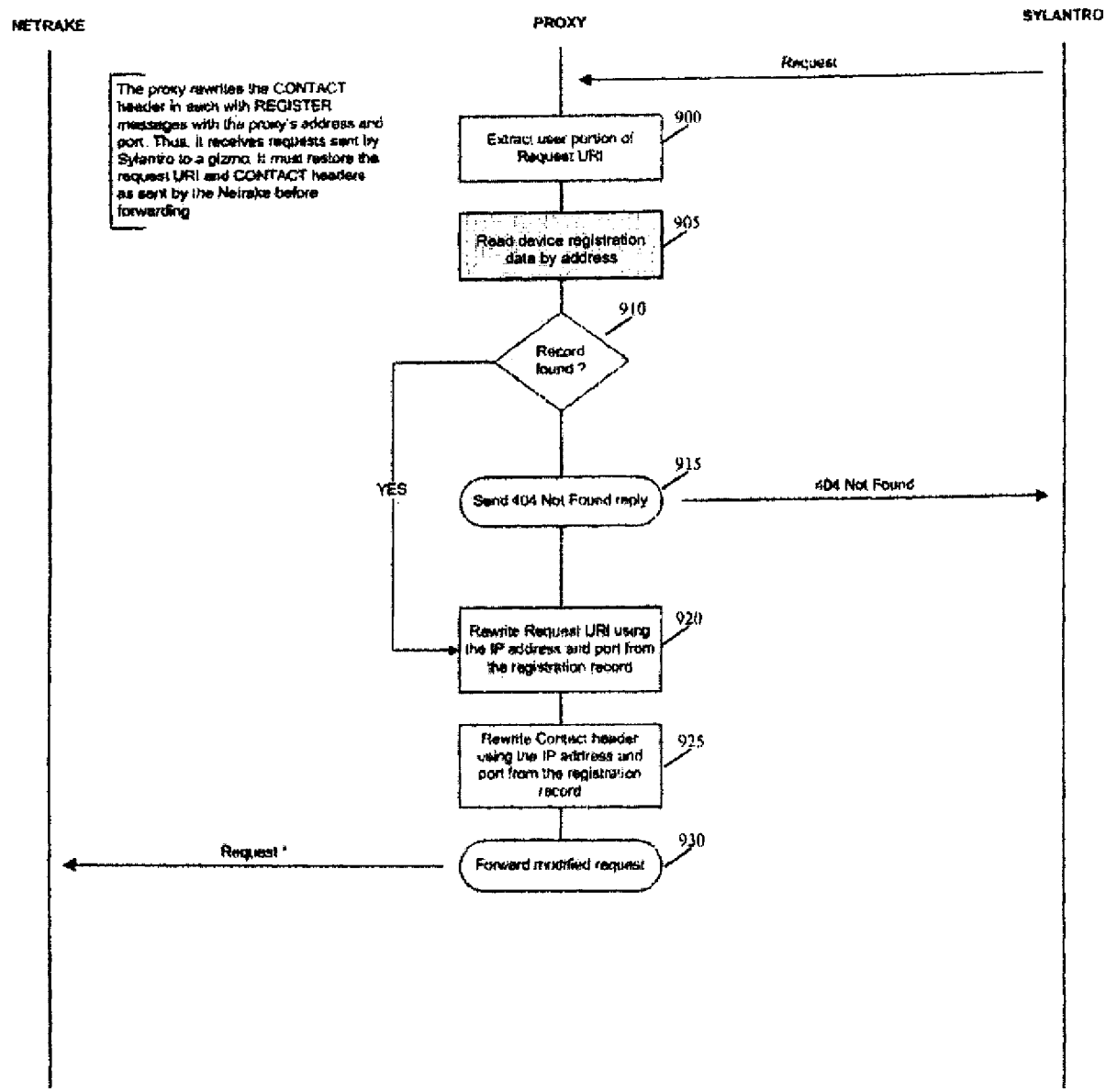
Figure 10:
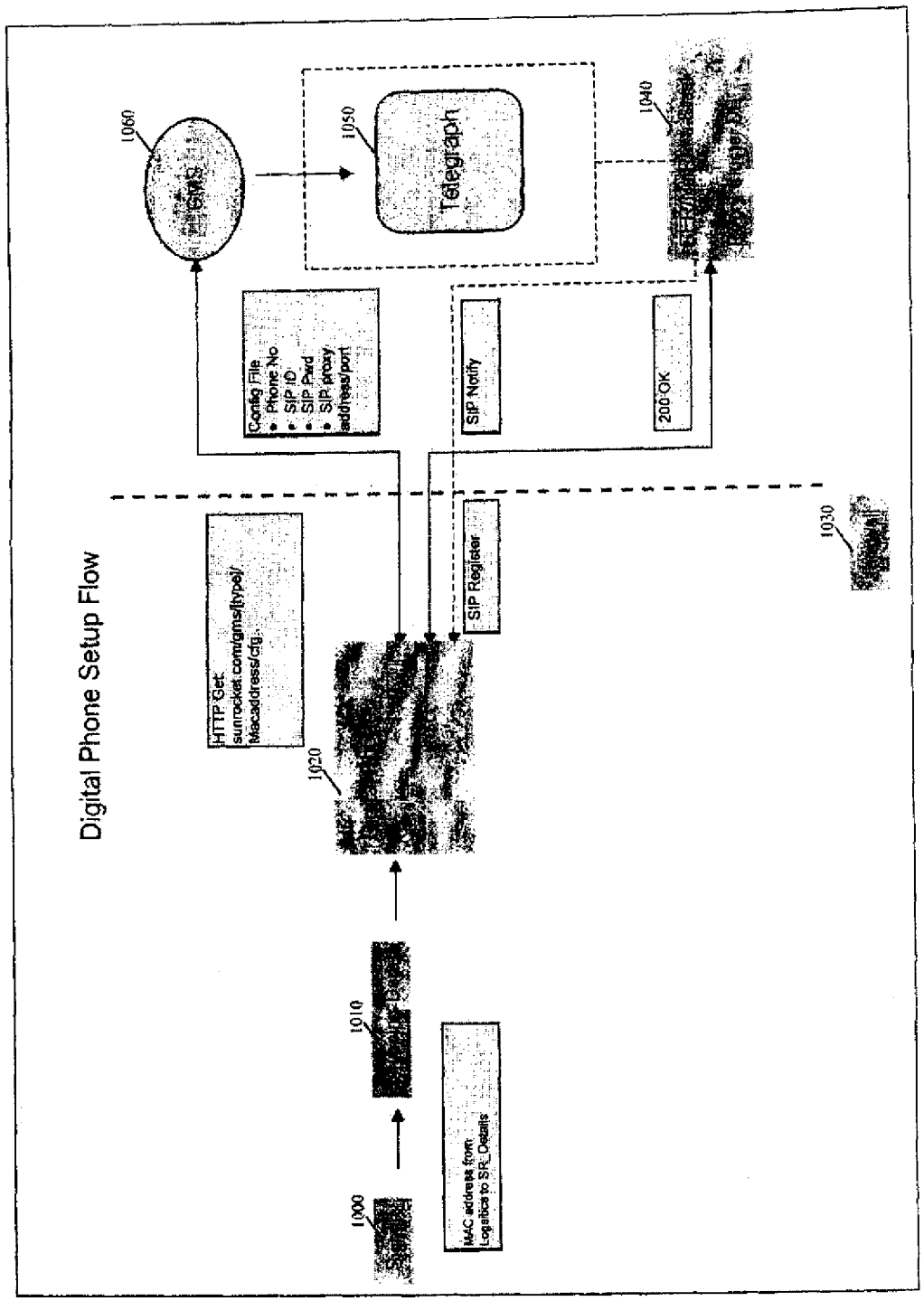

As illustrated in FIG. 10, if a new subscriber does not have a digital telephone at signup 1000, the service provider can provide one (block 1010). In such instances, the service provider can obtain the MAC address or other unique identifier associated with the digital phone prior to shipping and store this in customer database 170 and/or customer info database 142 of FIG. 1. In some embodiments, customer database 170 and customer info database 142 may contain duplicative information. Although this increases the overall system storage requirements, the duplicative information can be advantageous in the event of accidental or malicious data corruption.

Referring again to FIG. 10, when the subscriber receives his or her digital telephone, the subscriber can simply plug digital telephone 1020 into a power outlet and the broadband connection. Once digital telephone 1020 boots, it can obtain an internet protocol address (IP address) and related configuration information dynamically from a Dynamic Host Configuration Protocol (DHCP) server or the like, thereby allowing the digital telephone to begin accessing the Internet via the broadband connection. In some embodiments, if a DHCP or equivalent server is not available, the digital telephone may request the necessary information from the subscriber. In some embodiments, the digital telephone may be pre-configured to request additional configuration information from a fixed address, such as, without limitation, http://www.sunrocket.com/gms/[type]/MacAddress/CFG/, wherein [type] is a device type identifier associated with the digital telephone. In some embodiments, the digital telephone may include a Universal Serial Bus (USB) port or other such communications port, and the subscriber may connect the digital telephone to his or her computer and, through the use of specialized software, allow the computer to provide such initial configuration settings to the digital telephone without the need for the digital telephone establishing a link via the broadband network.

In some embodiments, Gizmo Management System (GMS) 178 of FIG. 1 can manage digital telephone requests for configuration information, collect status information on deployed digital telephones, and perform other such functions. GMS 178 of FIG. 1 and GMS 1060 of FIG. 10 are equivalents and provide similar functionality. GMS 1060 can respond to a configuration request from the digital telephone and authenticate the request based on the MAC address or other unique identifier associated with the digital telephone. GMS 1060 may also request or receive a credential from the digital telephone. Such a credential can be verified against information stored in Customer Database 170 and/or Customer Info Database 142 of FIG. 1 thereby further authenticating the digital telephone to the instant system. GMS 1060 can provide a variety of information to the digital telephone in response to a configuration request including, without limitation, the phone number to be associated with the digital telephone, a SIP identifier to be associated with the phone, a SIP password, and the Access SBC with which the digital telephone is to be associated. In some embodiments, GMS 1060 comprises a web server, and can provide the configuration information as an extensible markup language (XML) document, Hypertext markup language (HTML) document, or the like via hypertext transfer protocol (HTTP) or other similar or successor protocols. The digital telephone and GMS 1060 may employ SSL or other encryption as part of the HTTP communications, thereby allowing both the digital telephone and GMS 1060 to authenticate the information provided. In some embodiments, the configuration information may be encrypted and/or digitally signed using a shared password, public key encryption, or the like. In embodiments employing shared passwords, the digital telephones may permit the service provider to designate a new password as part of a configuration file. In such embodiments, the service provider may periodically change the password to help maintain overall system security. In some embodiments, GMS 1060 can be implemented as a Java Servlet. A Java Servlet is software executed by a web application server in response to a request for a resource. Java Servlets typically access databases to generate responses, rather than merely transferring static data files. Such a configuration can allow GMS 1060 to ensure that the most current information is provided to the digital telephone in response to each configuration information request.

In some embodiments, each time a digital telephone is rebooted the digital telephone initiates a re-registration process, wherein such a re-registration process may comprise obtaining the latest configuration information from GMS 1060 and then initiating the registration processes described above. Similarly, any time an operator or administrator of the instant system wishes to force a digital telephone to update its configuration, Telegraph 1050 can issue a SIP NOTIFY notice, using the information contained in proxy cluster DB 1040, which is the equivalent of cluster DB 136 of FIG. 1, to the digital telephone. The receipt of a SIP NOTIFY message by the digital telephone forces the digital telephone to obtain the latest configuration data. In some embodiments, the SIP NOTIFY message must be properly signed and/or authenticated for the digital telephone to update the configuration information. In some embodiments, a SIP NOTIFY message can force the digital telephone to reset itself to factory defaults or to other settings that are incompatible with the service provider, there by effectively disabling the digital phone.

Referring again to FIG. 1, in some embodiments, Ops Portal 176 of FIG. 1 can provide an interface through which operators or administrators view and search customer database 170 and/or customer information databases 142 and use Telegraph 180 to notify digital telephones, selectively or collectively, to reload their configurations, refresh or update firmware, and perform other such maintenance tasks. To facilitate such functionality, customer database 170 and/or customer information databases 142 may contain a variety of information about each digital telephone associated with the instant system, including, without limitation:

- MAC Address (which is used as the primary key for each database entry)
- Phone number
- Device type
- Current firmware revision
- Configuration template (overrides default template)
- Last download timestamp
- Last download response
- Last registration timestamp
- Encryption flag
- Encryption pass phrase
- Configuration settings (remote login, current codec used, and the like)
- Modification timestamp (set when configuration is changed)
- Outbound Proxy Address (also referred to herein as the Access SBC)
- Registration Proxy Address (also referred to herein as the RMS)
- Support queries by hardware manufacturer, software revision, account, phone number Ops Portal 176 also allows operators or administrators of the instant system to reconfigure digital telephones as needed. In some embodiments, Ops Portal 176 provides a portal through which an operator or administrator can alter a variety of settings for an individual digital telephone or for a set of digital telephones. Such settings include, without limitation, the Access SBC to which the digital telephone is assigned, the CCN to which the digital telephone is assigned, the shared passphrase/password, the software and/or firmware version to be installed, and subscriber-specific settings such as enabling/disabling accounts, enabling/disabling voicemail for the account, and the like.

To take advantages of the features and functions of the instant system, a digital telephone must register with the system. In addition, to enable both incoming and outgoing calls for digital telephones behind firewalls and to make sure any IP address change conducted by the ISP network at the subscriber location is quickly discovered, the digital telephone must periodically communicate with the instant system. If such periodic communications do not occur, many firewalls will close the port associated with incoming communications from the instant system or the ISP may dynamically change the subscriber's IP address, thereby rendering the digital telephone unable to receive incoming calls and other notifications. To accommodate digital telephones behind such firewalls and for other such purposes, some embodiments of the instant system, by default, can instruct the digital telephones to re-register periodically. In some embodiments, the re-registration period may be a fixed amount of time, such as thirty seconds. In some embodiments, when the digital telephone first registers with the instant system, the digital telephone and instant system can determine a maximum re-registration period for that individual digital telephone's environment by incrementally increasing the re-registration period until the digital telephone no longer receives responses from the instant system. In such embodiments, the re-registration period can then be decreased to a known successful re-registration period.

Digital telephone re-registration can be problematic, as traditional CCN's are not configured to concurrently handle the volume of incoming SIP registration messages that are generated as a result of such re-registrations. In some embodiments, such as the embodiment illustrated in FIG. 1, Access SBC 122 and SER 130 are configured to handle such re-registration requests, thereby offloading some of the workload from the CCN's.

Figure 6:
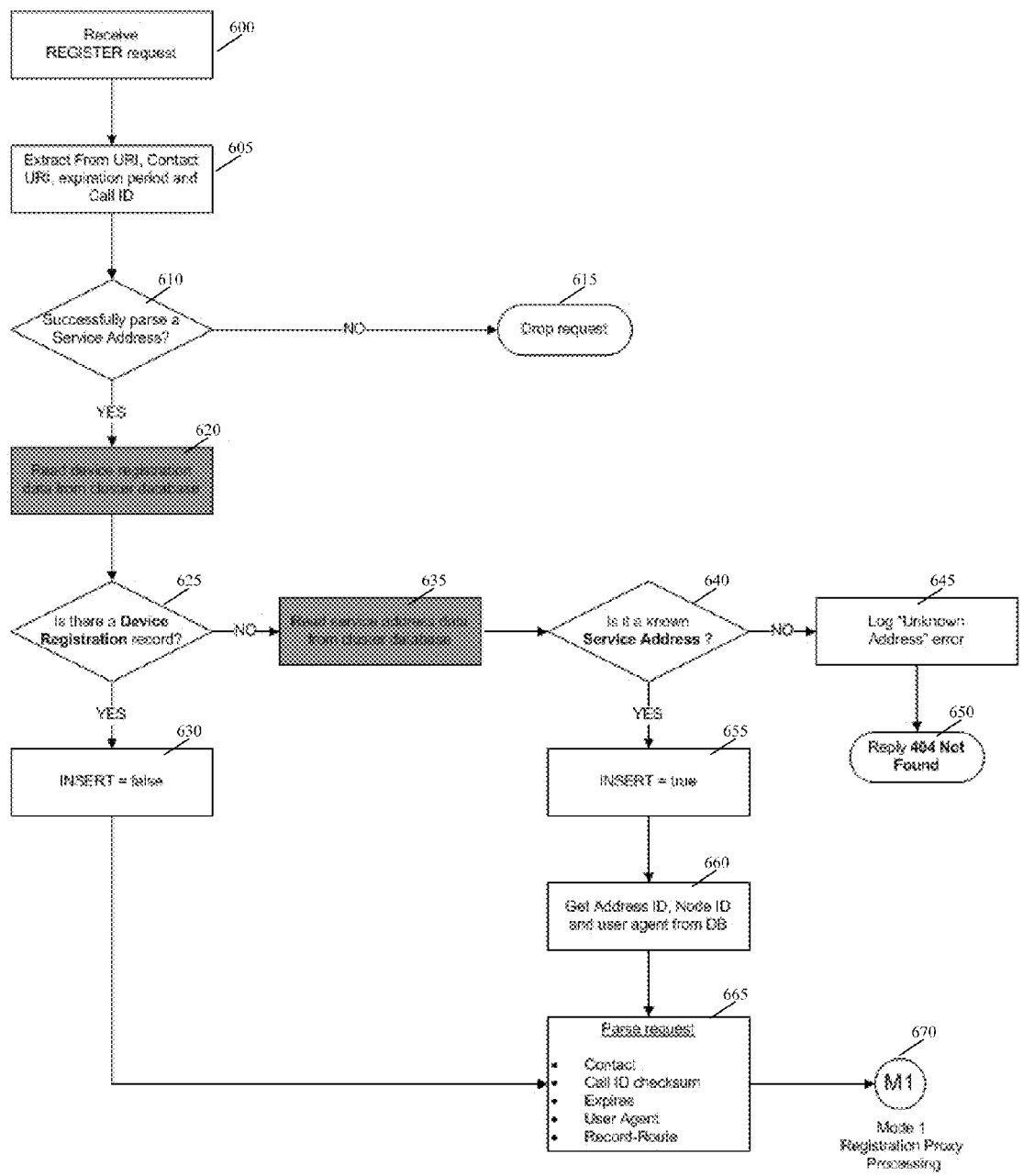
FIG. 6 is a flow chart illustrating an exemplary SIP device registration process.
Figure 7:
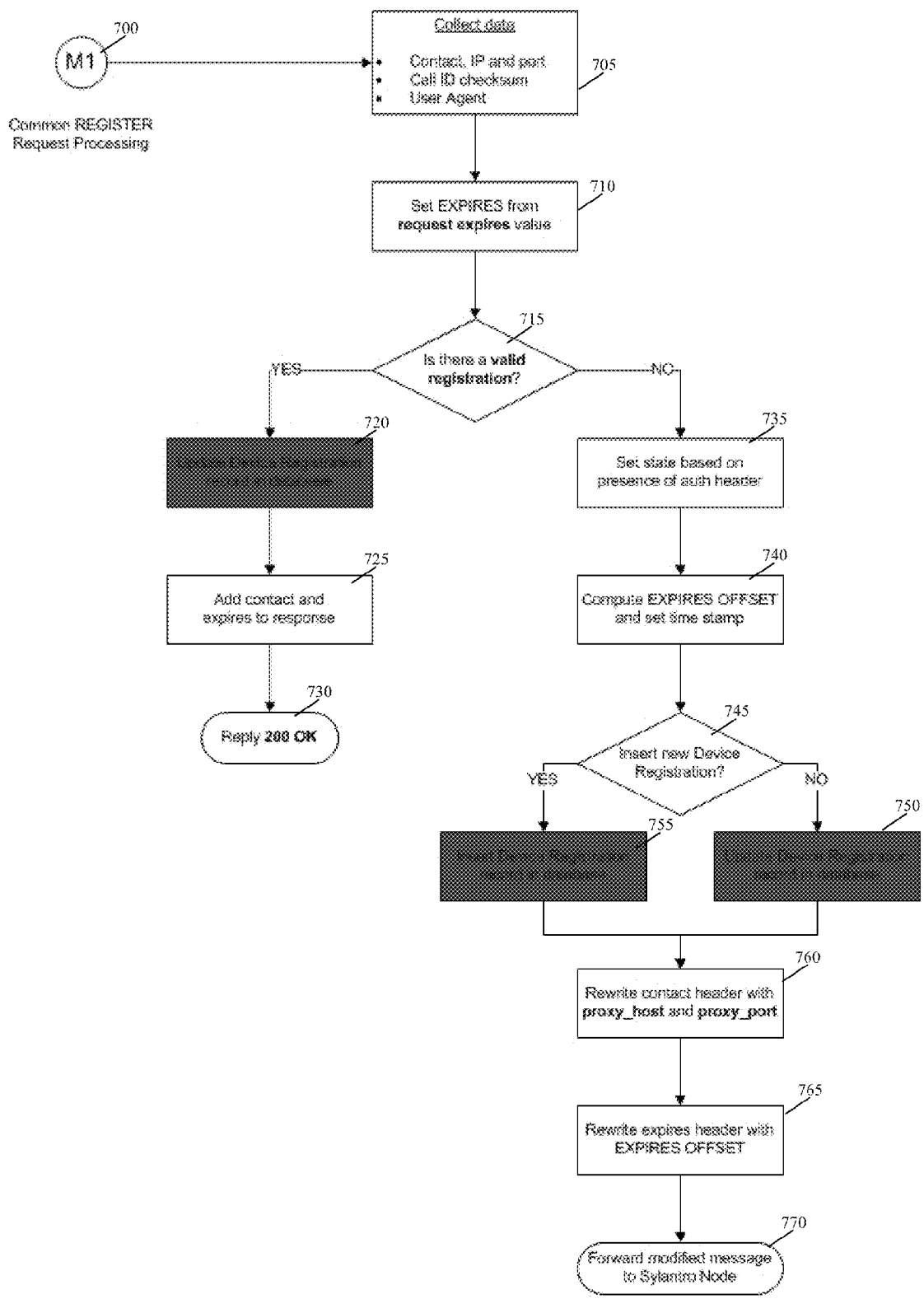
FIG. 7 is a flow chart illustrating a continuation of the SIP device registration process of FIG. 6.

FIGS. 6 and 7 illustrate an exemplary process by which such registration/re-registration messages can be handled by the instant system. In FIG. 6, when a registration message is received by a SER (Block 600), the SER extracts information from the SIP registration message including, without limitation, the phone number or service address of the device sending the registration message, the device IP address and the port on which the device will be listening for responses from the instant system, the expiration period for the request, and the device user agent (Block 605). If a service address or phone number cannot be successfully parsed from the registration message, the registration request is dropped (Block 615). If the service address or telephone number can be parsed, then the device registration data is read from the cluster database (cluster database 136 of FIG. 1). If the database contains an entry for the device, then an insert flag is set to false and the processing proceeds to block 665, described below. If the database does not contain an entry for that device (Block 625), then the information associated with the service address or telephone is read from the cluster database (Block 635). If the service address or telephone number is not known to the system (Block 640) then the request is recorded in a log (Block 645), and the instant system can return a "Not Found" message to the device making the registration request (Block 650). If the service address or telephone number is one known to the system (i.e., one for which there is a subscriber), then the insert flag is set to true (Block 655) and the address ID, node ID and user agent are obtained from the cluster database (Block 660).

In Block 665, the SER parses the registration request to obtain information. Such information may include, without limitation, contact information, a call identification checksum, the expiration for the request, the user agent, and the record-route. Processing then continues in Block 670 of FIG. 6, which is illustrated in FIG. 7 as Block 700. Blocks 705 and 710 are duplicative of Block 670 of FIG. 6, and illustrates the collection of information by parsing the registration request. In Block 715, the SER polls the cluster database to determine whether a valid registration exists for the digital telephone making the registration request. If there is a valid registration, the device registration record is updated in the database (Block 720), thereby indicating that the device successfully re-registered. Additional information may also be stored in the cluster database (Block 720). The SER then sends a "SIP 200 OK" message to the digital telephone in response, thereby indicating to the digital telephone that the re-registration was successful. Upon successful re-registration, the digital telephone can cease sending re-registration requests for a fixed period of time, such as, without limitation, 30 to 45 seconds. In some embodiments, if a response is not received to the re-registration request within a fixed timeout period, such as 500 milliseconds, the re-registration request may be re-sent. If the second re-registration also goes without a reply, the digital telephone may be configured to begin sending re-registration requests at longer intervals, such as every two to four seconds.

Referring again to block 715, if the cluster database does not include a valid registration then the SER can determine whether an authentication header is present in the registration request (Block 735). The SER can also compute the offset between the expiration of the registration request and the current time stamp (Block 740). If an authentication header is not present, then the SER can assume that the registration request is for a new digital telephone and can make appropriate entries in the cluster database (Block 755). If the authentication header is present, then the SER can assume that the registration request is for a previously registered digital telephone, and the information in the cluster database about that digital telephone may be updated as necessary (Block 750). The registration request information may be modified by the SER to include the port and name or other identifier for the SER, such that the CCN, can properly route information to the appropriate SER (Block 760 and 765). The registration information can then be forwarded to a CCN (Block 770).

Figure 8:
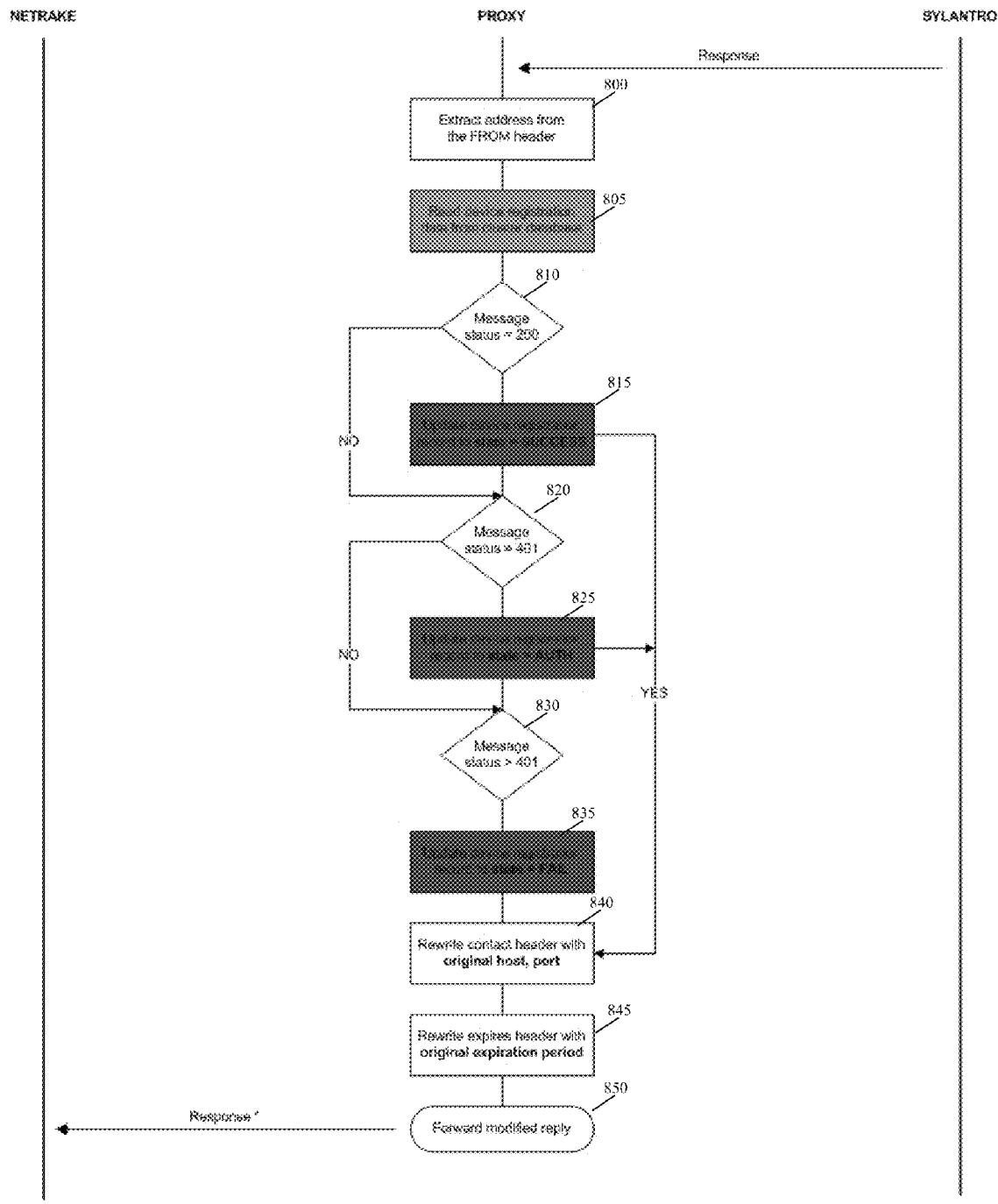
FIG. 8 is a flow chart illustrating an exemplary process flow through which a SER can amend the cluster database based on SIP response information received from a CCN and forward the resulting registration information to a digital telephone.

In some embodiments, the SER may only pass registration requests for a specific digital telephone to a CCN after a certain timeout period has expired since the previous registration request for that digital telephone was processed by a CCN. This process is described in more detail, below. FIG. 8 illustrates a method by which a SER can update the cluster database based on information received from a CCN once the CCN has been passed a registration request. In FIG. 8, the SER has modified the incoming registration request and substituted the SER's address and port information for that of the digital telephone, thereby allowing the SER to act as a proxy for the registration request, and ensuring that the SER can update the cluster database as necessary.

In FIG. 8, upon receipt of information from the CCN, the SER extracts the service address, telephone number, or other such identification information from the registration request (Block 800). The device registration results are then read from the cluster database for the device associated with the service address, telephone number, or the like extracted in Block 800 (Block 805). If the CCN returned a SIP status code of 200 (Block 810), the digital telephone was successfully registered and authenticated with the CCN and the cluster database registration record for the digital telephone is updated to a status of SUCCESS (Block 815), after which processing proceeds to Block 840 (described below). If the status code is a 401 (Block 820), then the digital telephone needs to reauthenticate with the CCN, and this information is recorded in the cluster database (Block 825), after which processing proceeds to Block 840. If the CCN did not return a SIP message status of 200 or a SIP message status of 401 (Block 830), the CCN has indicated that there was an error of some sort (e.g., an attempt to register a device that is not authorized to use the instant system) and the cluster database is updated to indicate a status of FAIL for that digital telephone. The SER modifies the header of the incoming message from the CCN and replaces the SER's information (e.g., header and port) with the information of the digital telephone (Block 840) and updates the expiration period with the original expiration period received from the digital telephone (Block 845). This modified message is then forwarded to the appropriate Access SBC for forwarding to the digital telephone.

Figure 9:
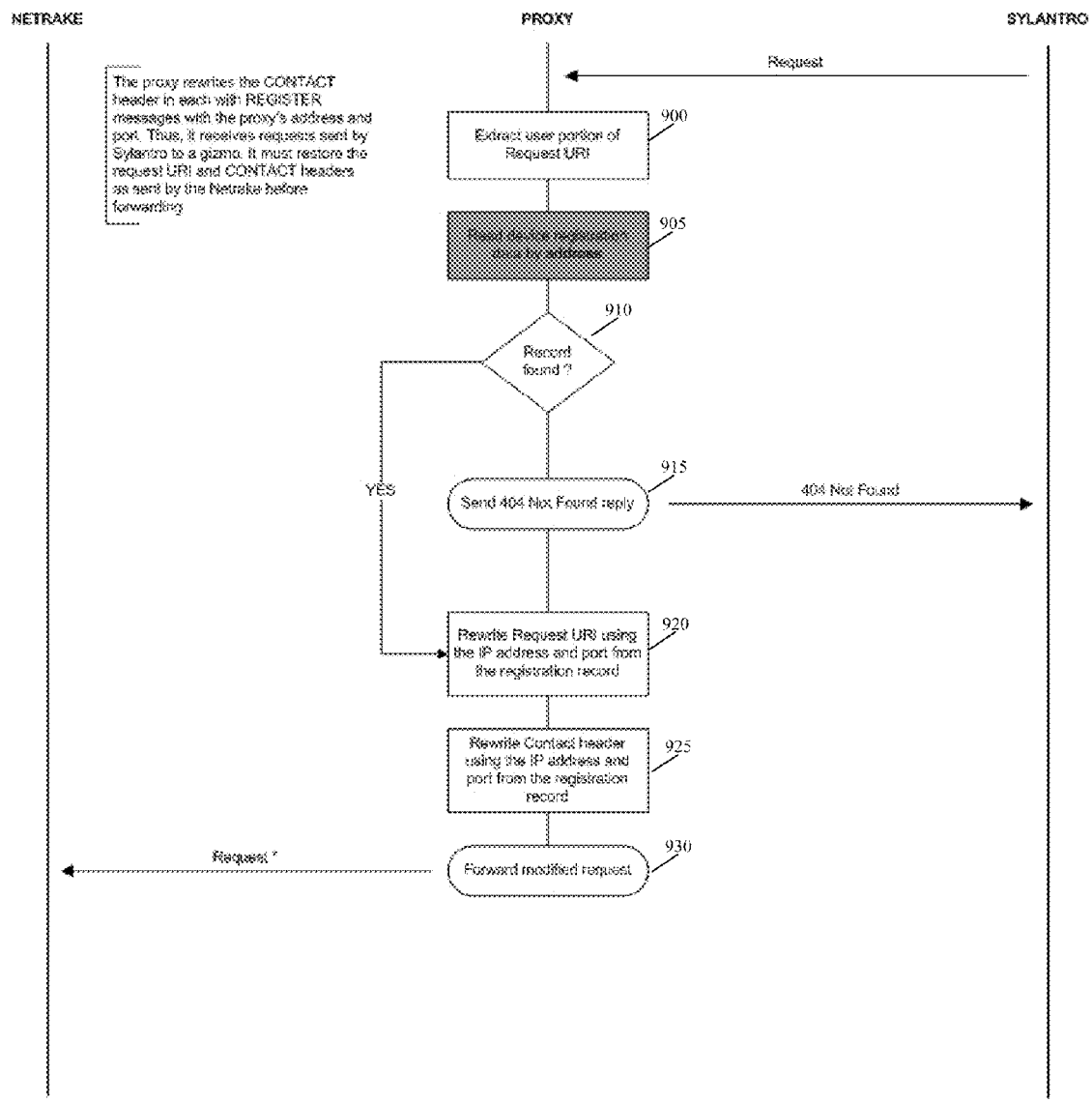
FIG. 9 is a flow chart illustrating the proxy-like functionality of the SER and an exemplary manner in which the SER can handle signaling requests generated by the CCN.

FIG. 9 illustrates the insertion of SER 130 as a proxy between an Access SBC and a CCN. In FIG. 9, a Termination SBC has initiated a call from a carrier partner or VoIP peer, and that request has been sent to a CCN for processing. The CCN has already determined that the telephone number associated with the call request corresponds to a subscriber of the instant system, and attempts to connect the call. However, as described below, the CCN's database may not be up to date with respect to the digital telephones currently serviced by the instant system. The SER proxy contains a more accurate list, and when the SER proxy receives the request from the CCN, the SER proxy first extracts the user portion of the request (Block 900) and searches the cluster database to determine whether a corresponding digital telephone has been registered (Block 905). If the a corresponding device has been registered (i.e., a record is found in the cluster database), then the request is rewritten such that the request contains the digital telephone's IP address or other such information (Block 920), and the header is amended such that the request is routed to an appropriate Access SBC (Block 925). The modified request is then forwarded to the Access SBC for processing (Block 930).

In some embodiments, when an Access SBC receives a registration request, the Access SBC will reply with a SIP status message of 200 or otherwise indicate that the registration request is successful if the registration request is from a digital telephone whose last successful registration/update with the SER layer was less than 60 minutes or other configurable time period ago. If the registration request is from a digital telephone whose last registration/update with the SER layer was more than an hour ago, the Access SBC will forward the registration request to the SER layer. As described above, if the SER layer determines that the registration request is from a previously registered digital telephone, and if the digital telephone was last authenticated against the CCN less than twenty-four hours ago, then the SER layer indicates to the Access SBC that the registration request was successful, and the Access SBC in turn returns this information to the digital telephone. Where the digital telephone was last authenticated against the CCN more than twenty-four hours or other configurable time period ago, the SER layer passes the registration request to the CCN and passes the result back to the Access SBC (as described above with respect to FIG. 8).

In some cases, such as, by way of example without limitation, where a communications failure shuts down access of the instant system to the Internet, or where a specific Internet Service Provider has hardware or software problems, the instant system may be flooded with registration requests. Some embodiments of the instant system can employ a novel method of handling such registration requests, which is described below. In such embodiments, a hashing algorithm can be applied to evenly distribute the registration requests over a larger time window. When such registration requests are received by an Access SBC, the Access SBC modifies the header such that the header has an expiration period greater than or equal to that expected by the SER, and forwards the registration request to a SER. The SER can then determine whether the registration request should be passed to the CCN and, if the registration should be passed to the CCN, the SER can modify the request such that it has an expiration period greater than or equal to that expected by the CCN. The modified request is then forwarded to the CCN, which in turn processes the request and returns a result to the SER. The SER can then modify the result such that it is routed to the appropriate Access SBC, and such that it contains a preferred expiration time.

In some embodiments, this preferred expiration time can be randomly chosen within a max_period, wherein the max_period value comprises the maximum period, in seconds, that the SER is authorized to authenticates incoming registration requests before forwarding them to a CCN for authentication. Such a random selection can distribute the reregistration requests.

While random redistribution can be effective, in some embodiments, the preferred expiration time can be computed by assigning each device registration record a unique, monotonically increasing, integer primary key, referred to herein as a registration_id (abbreviated as reg_id). The reg_id is assigned when the device registration record is initially inserted in the cluster database, and an expiration slot is calculated. An expiration slot is a portion of the max_period during which that particular digital telephone should initiate any registration requests. In some embodiments, the expiration slot for a device is fixed within the max_period window by taking the modulo of the reg_id by the max period value. The SER can then manipulate the expires value in requests sent to the CCN's and responses forwarded to the Access SBC's based on the slot, so that requests are distributed across the max_period window. In some embodiments, the SER calculates the ending date-time of the registration period and stores it with the device registration record in the cluster database when the request is forwarded to the CCN. This can become a hard limit to the registration's validity. The SER can also store in the cluster database the most recent date-time that the CCN acknowledged a register request with a SIP 200 OK response. The SER can then calculate two offsets to determine registration validity: the time elapsed since the most recent registration and the time remaining until the hard limit. This provides a range within which the registration is valid. A hash methodology is also applied to the request from the Access SBC. Assume the sbc_period (that is, the period at which the proxy expects to receive register requests from the Access SBC) is 14400 (4 hours). The interval between the current request and the device's slot is then calculated. If it is less than sbc_period, the Proxy can use the difference (for example, 1250 seconds) when it rewrites the SIP 200 response rather than the 14400 it received from the Access SBC, thereby instructing the Access SBC to forward the next request 1250 seconds later. This has the effect of aligning register requests with a preferred "slot", or interval in the sbc_period, during which that digital telephone is to issue register requests. This allows register requests to the SER from the Access SBC to be evenly distributed across the max_period window due to modulo hash used to calculate each slot.

While detailed and specific embodiments of the disclosed highly scalable IP-based communication system have been described herein, it will be apparent to those skilled in the art that various changes and modifications can be made therein without departing from the spirit and scope of the instant system. Thus, it is intended that the present disclosure cover these modifications and variations provided they come within the scope of any appended claims and/or their equivalents.

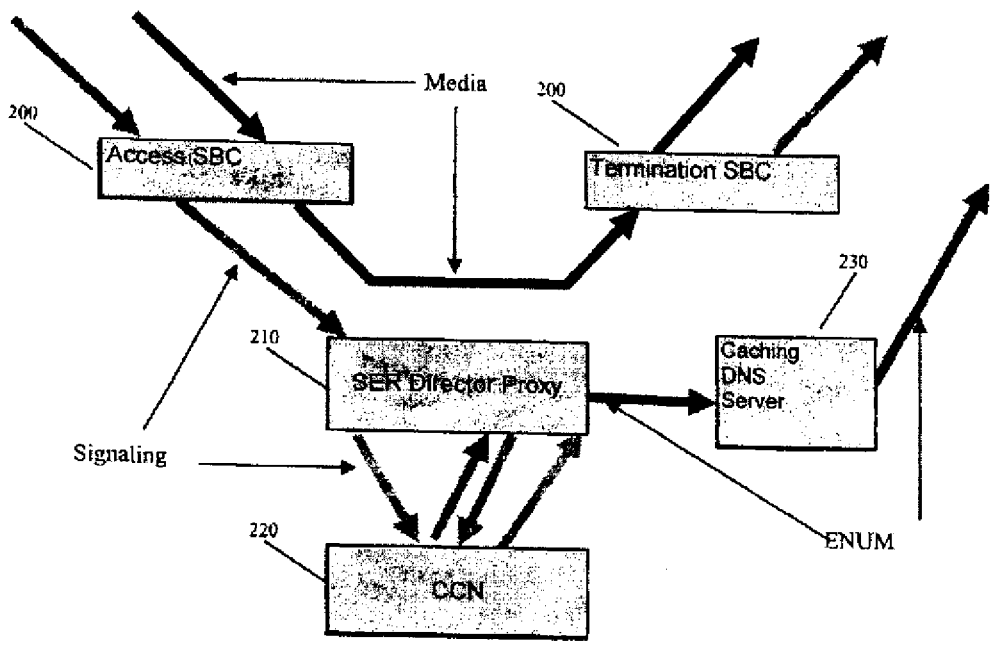

What is claimed is:

1. A method of relaying telecommunication information, comprising:
   receiving by a proxy call control information from a first IP-based telecommunications device, wherein the call control information comprises a header, wherein the header comprises a sender IP address, a sender identifier and a destination identifier, and a destination IP address, and wherein the destination IP address is associated with the proxy;
   recording the sender IP address in a database;
   modifying the call control information by replacing the sender IP address in the header with the IP address associated with the proxy;
   forwarding the call control information to a call control node;
   receiving from the call control node information to facilitate communication between the first IP-based telecommunications device and a second IP-based telecommunications device, wherein the second IP-based telecommunications device is associated with the destination identifier, and wherein the information comprises an IP address associated with the second IP-based telecommunications device;
   modifying the call control information by replacing the destination IP address with the IP address associated with the second IP-based telecommunications device and replacing the sender IP address with the recorded sender IP address; and
   forwarding the modified call control information to the second IP-based telecommunications device.

2. The method of claim 1, wherein the first IP-based telecommunications device is a Termination SBC.

3. The method of claim 2 wherein the second IP-based telecommunications device is a digital telephone.

4. The method of claim 3, further comprising relaying the call control information through an Access SBC as the call control information is forwarded to the second IP-based telecommunications device.

5. The method of claim 1, wherein the first IP-based telecommunications device is a first digital telephone.

6. The method of claim 5, wherein the second IP-based telecommunications device is a second digital telephone.

7. The method of claim 6, wherein the call control information received by the proxy from the first digital telephone is relayed through an Access SBC between the proxy and the first digital telephone.

8. The method of claim 6, wherein the call control information forwarded to the second IP-based telecommunications device is relayed through a Termination SBC between the proxy and the second digital telephone.

9. The method of claim 1, further comprising:
obtaining from a caller information source caller identification information associated with the sender identifier; and,
modifying the call control information such that the call control information comprises the caller identification information.

10. The method of claim 1, further comprising:
receiving by the proxy a request from the call control node for routing information associated with the destination IP address;
obtaining at least one route to the destination IP address; and,
providing the at least one route to the call control node.

11. The method of claim 1, wherein the sender identifier comprises a telephone number.

12. The method of claim 1, wherein the destination identifier comprises a telephone number.

13. A method of relaying telecommunication information, comprising:
receiving from a Termination SBC a request to initiate a telecommunications session between a caller and a destination, wherein the request comprises a caller telephone number and a destination telephone number, wherein the Termination SBC has an IP address associated therewith, and wherein the request is received by a proxy;
recording in a database an association of the Termination SBC IP address with the telecommunications session initiation request;
modifying the telecommunications session initiation request to create a first modified request, wherein the first modified request appears to be coming from the proxy;
forwarding the first modified request from the proxy to a call control node;
receiving from the call control node information to facilitate communication between the caller and the destination, wherein the information comprises an IP address associated with a digital telephone associated with the destination telephone number, and wherein the information is received by the proxy;
modifying one of the telecommunications session initiation request and the first modified request to create a second modified request, wherein the second modified request appears to be coming from the sender; and
forwarding the second modified call control information to the digital telephone associated with the destination telephone number.

14. The method of claim 13, further comprising:
receiving from a digital telephone associated with a caller the telecommunications session initiation request, wherein the telecommunications session initiation request is received by the Termination SBC and relayed to the proxy.

15. The method of claim 13, further comprising:
receiving from a media gateway associated with a carrier the telecommunications session initiation request, wherein the telecommunications session initiation request is received by the Termination SBC and relayed to the proxy.

16. The method of claim 13, further comprising:
obtaining from a caller information source caller identification information associated with the sender identifier; and,
modifying the second modified telecommunication session initiation request that the second modified request comprises the caller identification information.

17. The method of claim 13, further comprising:
receiving by the proxy a request from the call control node for routing information associated with the destination;
obtaining at least one route to the destination; and,
providing the at least one route to the call control node.

18. A method of relaying telecommunication information, comprising:
receiving from an Access SBC a request to initiate a telecommunications session between a caller and a destination, wherein the request comprises a caller telephone number and a destination telephone number, wherein the Access SBC has an IP address associated therewith, and wherein the request is received by a proxy;
recording in a database an association of the Access SBC IP address with the telecommunications session initiation request;
modifying the telecommunications session initiation request to create a first modified request, wherein the first modified request appears to be coming from the proxy;
forwarding the first modified request from the proxy to a call control node;
receiving from the call control node information to facilitate communication between the caller and the destination, wherein the information comprises routing information, and wherein the information is received by the proxy;
modifying one of the telecommunications session initiation request and the first modified request to create a second modified request, wherein the second modified request appears to be coming from the Access SBC; and
forwarding the second modified call control information to the destination utilizing the routing information.

19. The method of claim 18, further comprising:
receiving from a digital telephone associated with a caller the telecommunications session initiation request, wherein the telecommunications session initiation request is received by the Access SBC and relayed to the proxy.

20. The method of claim 18, further comprising:
obtaining from a caller information source caller identification information associated with the caller; and,
modifying the second modified telecommunication session initiation request that the second modified request comprises the caller identification information.

21. The method of claim 18, further comprising:
receiving by the proxy a request from the call control node for routing information associated with the destination;
obtaining at least one route to the destination; and,
providing the at least one route to the call control node.

* * * * *

UNITED STATES PATENT AND TRADEMARK OFFICE
CERTIFICATE OF CORRECTION

PATENT NO. : 8,089,975 B2  
APPLICATION NO. : 12/109908  
DATED : January 3, 2012  
INVENTOR(S) : DuPertuis et al.

Page 1 of 12

It is certified that error appears in the above-identified patent and that said Letters Patent is hereby corrected as shown below:

Title page, illustrative fig. 2, should be deleted and substitute therefore the attached title page consisting illustrative fig. 2.

In the Drawings

The drawing sheets 1-10 consisting of Fig(s) 1-10 should be deleted and substitute therefore the attached drawing sheets 1-10 consisting of Fig(s) 1-10.

Signed and Sealed this  
Tenth Day of April, 2012

David J. Kappos  
*Director of the United States Patent and Trademark Office*

United States Patent
DuPertuis et al.

(10) Patent No.: US 8,089,975 B2
(45) Date of Patent: Jan. 3, 2012

(54) HIGHLY SCALABLE INTERNET PROTOCOL-BASED COMMUNICATIONS SYSTEM

(75) Inventors: Greg DuPertuis, Leesburg, VA (US); Mark Fedor, Purcellville, VA (US)

(73) Assignee: Sunrocket (Assignment for the Benefit of Creditors), LLC, Mountain View, CA (US)

( * ) Notice: Subject to any disclaimer, the term of this patent is extended or adjusted under 35 U.S.C. 154(b) by 920 days.

(21) Appl. No.: 12/109,908

(22) Filed: Apr. 25, 2008
(Under 37 CFR 1.47)

(65) Prior Publication Data
US 2009/0201911 A1    Aug. 13, 2009

Related U.S. Application Data

(63) Continuation of application No. 11/857,290, filed on Sep. 18, 2007, now abandoned.

(51) Int. Cl.
*H04L 12/28*    (2006.01)
*H04J 1/16*    (2006.01)

(52) U.S. Cl. ......... 370/401; 370/252; 370/352; 370/389

(58) Field of Classification Search ............... 370/352, 370/401, 389, 252
See application file for complete search history.

(56) References Cited

U.S. PATENT DOCUMENTS
2006/0045068 A1* 3/2006 Wu et al. ............ 370/352
* cited by examiner

*Primary Examiner* — John Pezzlo
(74) *Attorney, Agent, or Firm* — Greenberg Traurig LLP

(57) ABSTRACT

A highly scalable Internet Protocol (IP) based communications system which provides voice and other communication services to end-users. The instant system incorporates a unique architecture which simplifies scaling of services to hundreds of thousands and even millions of subscribers. The instant system architecture includes a means for directly connecting a plurality of peered service providers thereby obviating the need to move the communications across the PSTN. By bypassing the PSTN, the instant system can leverage the advantages of IP-based networks in meeting subscriber communications needs such as, without limitation, quality of service, service up-time, and advanced feature sets. Bypassing the PSTN also allows the peered partners to negotiate communications rates between themselves, without incurring PSTN carrier fees.

21 Claims, 10 Drawing Sheets